United States Patent
Gaal et al.

(10) Patent No.: US 9,831,994 B2
(45) Date of Patent: Nov. 28, 2017

(54) METHOD AND APPARATUSES FOR USING CHANNEL STATE INFORMATION REFERENCE SIGNALS

(71) Applicant: QUALCOMM Incorporated, San Diego, CA (US)

(72) Inventors: Peter Gaal, San Diego, CA (US); Juan Montojo, San Diego, CA (US); Kapil Bhattad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/820,346

(22) Filed: Aug. 6, 2015

(65) Prior Publication Data

US 2015/0351082 A1    Dec. 3, 2015

Related U.S. Application Data

(62) Division of application No. 13/100,215, filed on May 3, 2011, now Pat. No. 9,136,997.

(60) Provisional application No. 61/331,346, filed on May 4, 2010.

(51) Int. Cl.
*H04W 72/04* (2009.01)
*H04L 5/00* (2006.01)

(52) U.S. Cl.
CPC .................. *H04L 5/0048* (2013.01)

(58) Field of Classification Search
None
See application file for complete search history.

(56) References Cited

U.S. PATENT DOCUMENTS

| | | | |
|---|---|---|---|
| 8,208,920 B2 | 6/2012 | Sampath et al. | |
| 8,305,987 B2 | 11/2012 | Fong et al. | |
| 8,315,639 B2 | 11/2012 | Kim et al. | |
| 8,995,465 B2 | 3/2015 | Bhattad et al. | |
| 9,094,978 B2 * | 7/2015 | Chmiel | H04L 5/001 |
| 2006/0182192 A1 | 8/2006 | Takano | |
| 2009/0252077 A1 | 10/2009 | Khandekar et al. | |
| 2010/0032109 A1 | 2/2010 | Okachi | |
| 2010/0110983 A1 | 5/2010 | Fu | |
| 2010/0150103 A1 | 6/2010 | Womack et al. | |
| 2011/0128883 A1 | 6/2011 | Chung et al. | |
| 2011/0170496 A1 | 7/2011 | Fong et al. | |
| 2011/0208842 A1 | 8/2011 | Mildh et al. | |

(Continued)

FOREIGN PATENT DOCUMENTS

| | | |
|---|---|---|
| CN | 101635950 A | 1/2010 |
| JP | 2006203685 A | 8/2006 |

(Continued)

OTHER PUBLICATIONS

Huawei, et al., "Further considerations on muting for R-PDCCH", 3GPP TSG-RAN WG1#63b R1-110018, Jan. 21, 2011, 3 Pages.

(Continued)

*Primary Examiner* — Kouroush Mohebbi
(74) *Attorney, Agent, or Firm* — Arent Fox LLP

(57) ABSTRACT

In a wireless communication system, a wireless device is identified as being a relay device. A channel state information reference signal (CSI-RS) configuration is selected such that at least one CSI-RS can be transmitted to the wireless device in a subset of subframes assigned to relay backhaul transmissions.

12 Claims, 28 Drawing Sheets

(56) References Cited

U.S. PATENT DOCUMENTS

| | | | |
|---|---|---|---|
| 2011/0317657 A1* | 12/2011 | Chmiel | H04L 5/001 370/331 |
| 2012/0120842 A1* | 5/2012 | Kim | H04B 7/024 370/252 |
| 2012/0134273 A1 | 5/2012 | Bhattad et al. | |
| 2016/0242164 A1* | 8/2016 | Chmiel | H04L 5/001 |

FOREIGN PATENT DOCUMENTS

| | | |
|---|---|---|
| WO | WO-2008091126 A1 | 7/2008 |
| WO | 2010006285 A2 | 1/2010 |
| WO | WO-2010013962 A2 | 2/2010 |
| WO | WO-2010039739 A2 | 4/2010 |
| WO | WO-2011046387 A2 | 4/2011 |
| WO | WO-2011055986 A2 | 5/2011 |

OTHER PUBLICATIONS

LG Electronics Inc: "R-PDCCH RE Mapping", 3GPP TSG-RAN WG1#62b, R1-105349, Oct. 15, 2010, 3 Pages.

QUALCOMM Incorporated: "Remaining aspects of CSI-RS", 3GPP Draft; R1-106351 Remaining Aspects of CSI-RS, 3rd Generation Partnership Project (3GPP), Mobi Le Competence Centre ; 650, Route Des Lucioles ; F-06921 Sophia-Antipolis Cedex ; France, vol. RAN WG1, No. Jacksonville, USA; 20101115, Nov. 11, 2010 (Nov. 11, 2010), 7 Pages, XP050468455, [retrieved on Nov. 11, 2010].

3GPP TS 36.211, "3rd Generation Partnership Project; Technical Specification Group Radio Access Network; Evolved Universal Terrestrial Radio Access (E-UTRA) Physical Channels and Modulation (Release 9)", (Mar. 31, 2010), pp. 1-85, V9.1.0.

3GPP TSG RAN WG1 meeting #60, CSI-RS Pattern Design, Huawei, R1-101057, San Francisco, USA, Feb. 22-26, 2010, pp. 1-6.

3rd Generation Partnership Project; Technical Specification Group Radio Access Network; Evolved Universal Terrestrial Radio Access (E-UTRA); Further advancements for E-UTRA physical layer aspects (Release 9), 3GPP TR 36.814 V9.0.0 (Mar. 2010).

Catt, "Issues concerning CSI-RS design for LTE-A", 3GPP TSG RAN WG1 meeting #59bis, R1-100020, Valencia, Spain, Jan. 18-22, 2010.

Ericsson et al., "Considerations on CSI-RS Design", 3GPP Draft; R1-102628_Considerations_on_CSI_RS_Design, 3rd Generation Partnership Project (3GPP), Mobile Competence Centre ; 650, Route Des Lucioles ; F-06921 Sophia-Antipolis Cedex ; France, vol. RAN WGl, no. Montreal, Canada; May 10, 2010, May 5, 2010 (May 5, 2010), XP050420300, [retrieved on May 5, 2010].

ETRI: "Reference signals for eNB-relay backhaul link", 3GPP Draft; R1-094399 Backhaul DL RS, 3rd Generation Partnership Project (3GPP), Mobile Competence Centre ; 650, Route Des Lucioles ; F-06921 Sophia-Antipolis Cedex ; France, no. Miyazaki; Oct. 12, 2009, Oct. 12, 2009 (Oct. 12, 2009), XP050388834.

Huawei: "CSI-RS Pattern Design", 3GPP TSG-RAN WG1 Meeting #61, R1-103101, May 10, 2010, pp. 1-8.

Huawei, "Inter-cell CSI-RS Analysis", 3GPP TSG RAN WG1 meeting #59bis, R1-100248, Valencia, Spain, Jan. 18-22, 2009.

International Search Report and Written Opinion—PCT/US2011/035248, International Search Authority—European Patent Office—Sep. 19, 2011.

International Search Report and Written Opinion—PCT/US2011/038822, ISA/EPO—Jul. 20, 2011.

Kim E.S., et al., "Design of reference signal in LTE-A system", U.S. Appl. No. 61/252,177, customer No. 67487, dated Oct. 16, 2009, pp. 1-28.

Kim E.S., "Method and apparatus of transmitting reference signal in relay communication system", Korean Intellectual Property Office, 10-2010-0013593, Feb. 12, 2010, pp. 1-34.

LG Electronics: "Intercell muting for CSI-RS",3GPP Draft; RI-102420 Intercell-CSIRS-Muting, 3rd Generation Partnership Project (3GPP), Mobile Competence Centre ; 650, Route Des Lucioles ; F-06921 Sophia-Antipolis Cedex ; France, vol. RAN WGl, no. Beijing, china; Apr. 12, 2010, Apr. 9, 2010 (Apr. 9, 2010), XP050419750.

LG Electronics: "Remaining Issues on CSI-RS Design", 3GPP Draft; R1-102378, 3rd Generation Partnership Project (3GPP), Mobile Competence Centre ; 650, Routes des Lucioles ; F-06921 Sophia-Antipolis Cedex ; France, vol. RAN WGl, no. Beijing, china; Apr. 12, 2010, Apr. 6, 2010 (Apr. 6, 2010), XP050419601, [retrieved on Apr. 6, 2010].

Nokia et al: "Achievable CQI measurement accuracy over CSI-RS", 3GPP Draft; RI-101900, 3rd Generation Partnership Project (3GPP), Mobile Competence Centre ; 650, Routes Des Lucioles ; F-06921 Sophia-Antipolis Cedex ; France, vol. RAN WGl, no. Beijing, china; Apr. 12, 2010, Apr. 7, 2010 (Apr. 7, 2010), XP050419674.

Nokia Siemens Networks et al: "Control Channel for Relay Backhaul link" 3GPP Draft; R1-091763_Control_Relays_Backhaul, 3rd Generation Partnership Project (3GPP), Mobile Competence Centre ; 650, Route Des Lucioles ; F-06921 Sophia-Antipolis Cedex; France, no. San Francisco, USA; Apr. 28, 2009, Apr. 28, 2009 (Apr. 28, 2009), XP050339287.

NTT DOCOMO, Intra-cell CSI-RS designu, 3GPP Draft; R1-103253 Intra-Cell CSI RS, 3rd Generation Partnership Project (3GPP), Mobile Competence Centre ; 650, Route Des Luci Oles ; F-06921 Sophi A-Anti POL1 S Cedex ; France, vol. RAN WG1, no. Montreal, Canada; May 10, 2010, May 4, 2010 (May 4, 2010) , XP050420281.

NTT DOCOMO: "DL RS Design for LTE-Advanced", 3GPP Draft; RI-091483 DL RS, 3rd Generation Partnership Project (3GPP), Mobile Competence Centre ; 650, Route Des Lucioles ; F-06921 Sophia-Antipolis Cedex ; France, no. Seoul, Korea; Mar. 18, 2009, Mar. 18, 2009 (Mar. 18, 2009), XP050339046.

Parkvall S et al., "The Evolution of LTE towards IMT-Advanced", Journal of Communications, Academy Publishers, Oulu, FI, vol. 4, No. 3, Apr. 1, 2009 (Apr. 1, 2009), pp. 146-154, XP008113534, ISSN: 1796-2021, DOI:10.4304/JCM.4.3.146-154.

Qualcomm Europe: "Details of CSI-RS", 3GPP TSG-RAN WG1 #59, R1-094867, Nov. 9-13, 2009, Jeju, Korea, pp. 1-6.

Qualcomm Europe: "DM-RS for R-PDCCH", 3GPP TSG-RAN WG1#59 R1-094891, 2 pages, Nov. 5, 2009.

Qualcomm Europe, "Further considerations and link simulations on reference signals LTE-A", 3GPP, 3rd Generation Partnership Project, No. R1-090875, Feb. 9, 2009 (Feb. 9, 2009), pp. 1-6, XP002616650.

Qualcomm Europe, "Further details on CSI-RS" 3GPP TSG-RAN WG1 #60, R1-101634, Feb. 22-26, 2010, San Francisco, USA.

Qualcomm Europe, "Further details on CSI-RS", 3GPP TSG-RAN WG1 #60bis, R1-102331, Apr. 12-16, 2010, Beijing, China.

Qualcomm Inc: "Benefits of Muting for Enhanced CSI Estimation", 3GPP Draft; RI-102332 Benefits of Muting, 3rd Generation Partnership Project (3GPP), Mobile Competence Centre ; 650, Route Des Lucioles ; F-06921 Sophia-Antipolis Cedex ; France, vol. RAN WGl, no. Beijing, china; Apr. 7, 2010, Apr. 7, 2010 (Apr. 7, 2010), XP050419699.

Qualcomm Incorporated, "CSI-RS for LTE-Advanced", 3GPP TSG-RAN WG1#61b, R1-103545, Jun. 22, 2010 Retreived from the Internet: http://www.3gpp.org/ftp/tsg_ran/WG1_RL1/TSGR1_61b/Docs/R1-103545.zip, pp. 1-8.

Qualcomm Incorporated: "Further details on CSI-RS", 3GPP TSG-RAN WG1 Meeting #60b, R1-103288, May 10, 2010, pp. 1-11.

Samsung: "CSI-RS transmission aspects in TDD and impact to LTE Rel-8", 3GPP TSG-RAN WG1#59b R1-100107, 9 pages, Jan. 12, 2010.

Samsung: "Discussion on CSI-RS based CQI Reporting for Rel-10", 3GPP TSG-RAN WG1 Meeting #61, R1-103030, May 10, 2010, pp. 1-3.

Samsung: "Discussion on CSI-RS based CQI Reporting for Rel-10", 3GPP TSG-RAN WG1#60b R1-102202, 3 pages, Apr. 6, 2010.

Samsung: "Discussions on CSI-RS for LTE-Advanced", 3GPP TSG-RAN WG1 Meeting #59, R1-094574, Nov. 9, 2009, 6 pages.

Samsung, "Performance evaluation for CSI-RS design", 3GPP TSG RAN WG1 #59bis, R1-100106, Valencia, Spain, Jan. 18-22, 2009.

(56) References Cited

OTHER PUBLICATIONS

Taiwan Search Report—TW100115629—TIPO—Nov. 18, 2013.
Texas Instruments: "PDSCH Muting: N-MSE for Inter-cell CSI Estimation", 3GPP Draft; RI-102099 TI NMSE for Inter-Cell CSI Estimation, 3rd Generation Partnership Project (3QPP), Mobile Competence Centre ; 650, Route Des Lucioles ; F-06921 Sophia-Antipolis Cedex ; France, vol. RAN WGI, no. Beijing, china; Apr. 12, 2010, Apr. 9, 2010 (Apr. 9, 2010), XP050419746.
Woasis: "Multi-Cell CSI-RS Pattern and Sequence", 3GPP TSG-RAN WG1 Meeting #59, R1-094907, Nov. 9, 2009, pp. 1-5.
ZTE Corporation, "CSI-RS Pattern Design for LTE-Advanced", 3GPP TSG-RAN WG1 Meeting #60 R1-100969, Feb. 18, 2010, pp. 1-7, URL: http://www.3gpp.org/ftp/tsg_ran/wg1_rl1/TSGR1_60/Docs/.
ZTE: "CSI-RS Pattern and Configuration", 3GPP Draft; R1-102899 CSI-RS Pattern and Configuration, 3rd Generation Partnership Project (3GPP), Mobile Competence Centre ; 650, Route Des Lucioles ; F-06921 Sophia-Antipolis Cedex ; France, vol. RAN WGI, no. Montreal, Canada; May 10, 2010, May 4, 2010 (May 4, 2010), XP050420039, [retrieved on May 4, 2010].
ZTE: "DL Reference Signal Design for CSI generation in LTE-Advanced", 3GPP TSG-RAN WG1 Meeting #57, R1-091714, May 4, 2009, pp. 1-6.
Interdigital Communications, LLC: "Assumptions for CSI-RS Design", R1-093885, Oct. 12th-16th, 2009, 7 Page.
NEC Group: "Reference Signals for Demodulating R-PDCCH Channel", R1-100309, Jan. 18-22, 2010, pp. 1-5.
ZTE Corporation: "Intra-cell CSI-RS Allocation Pattern", 3GPP TSG-RAN WG1 Meeting #60bis, R1-101827, Apr. 12-16, 2010, pp. 1-5.

* cited by examiner

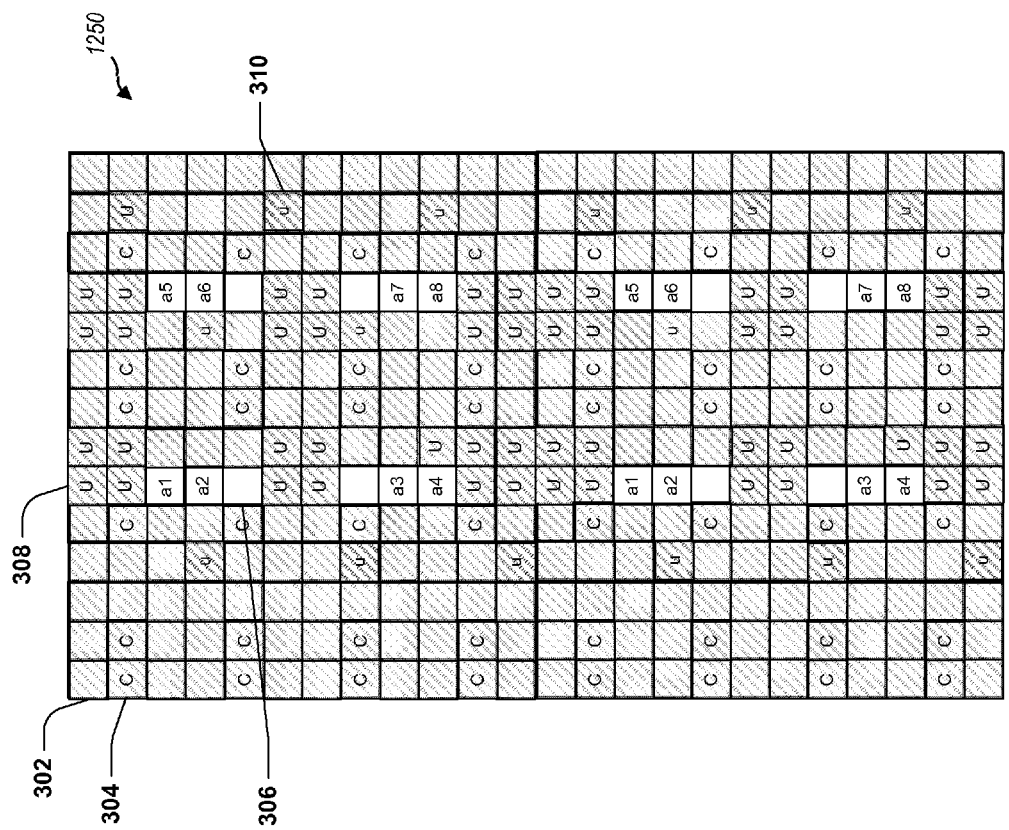

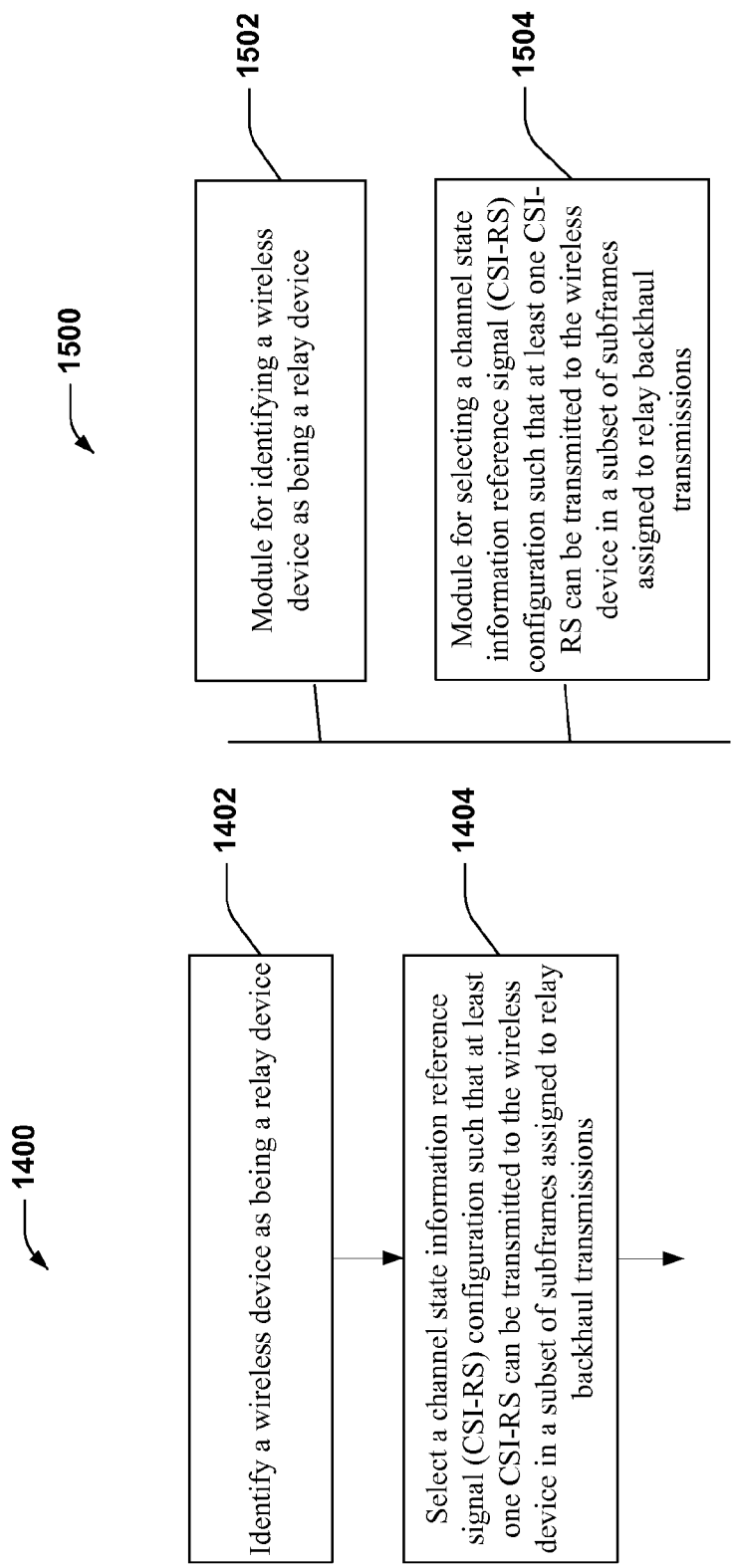

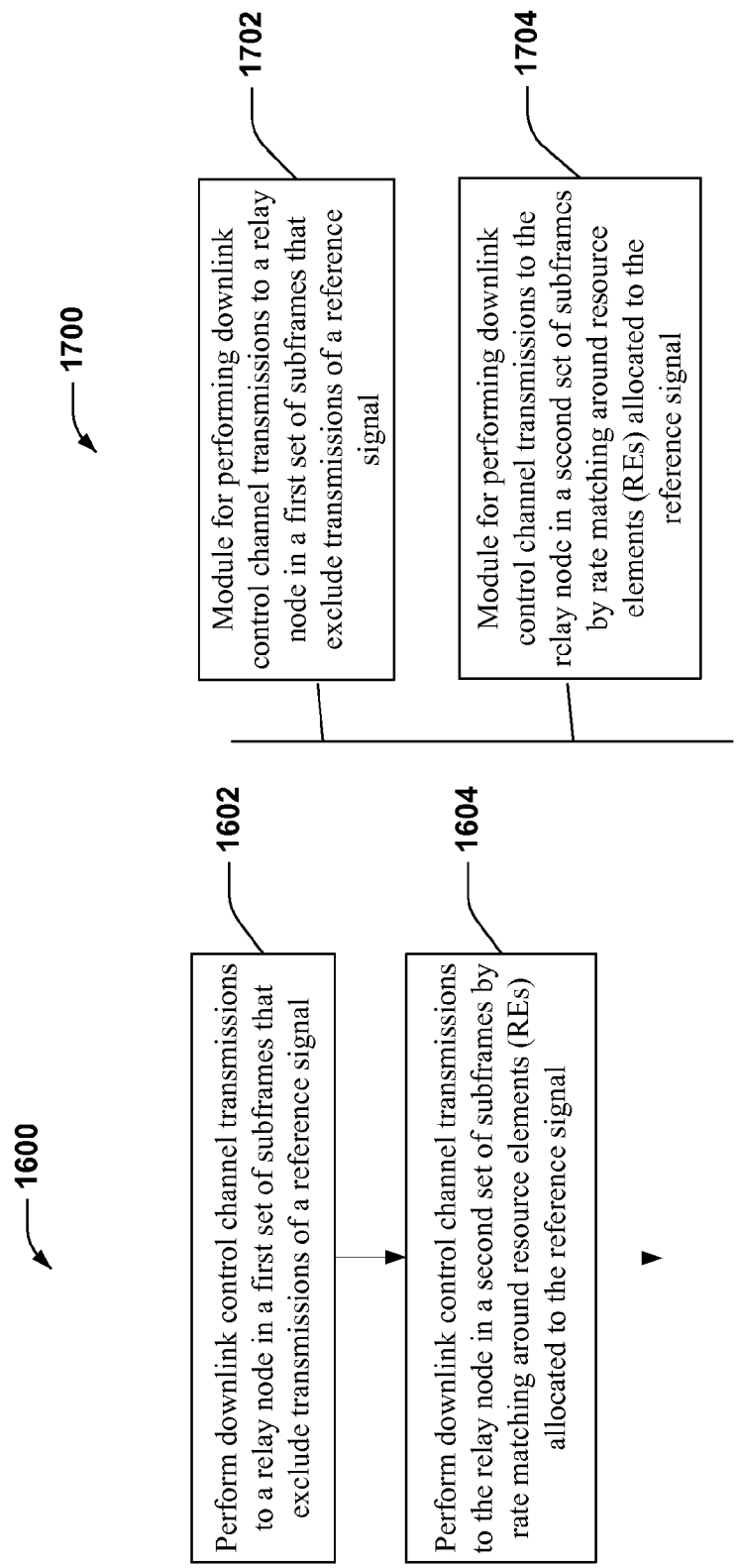

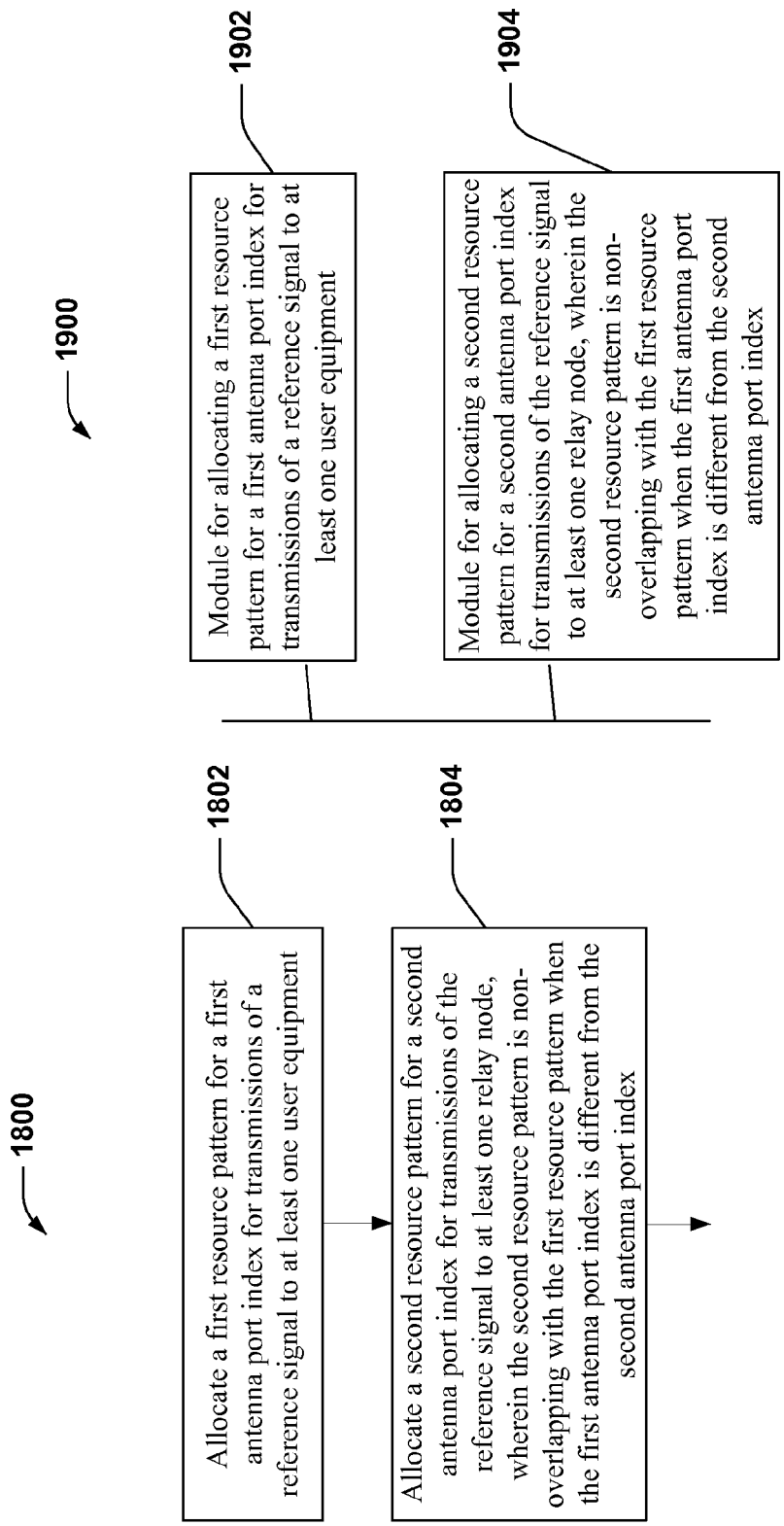

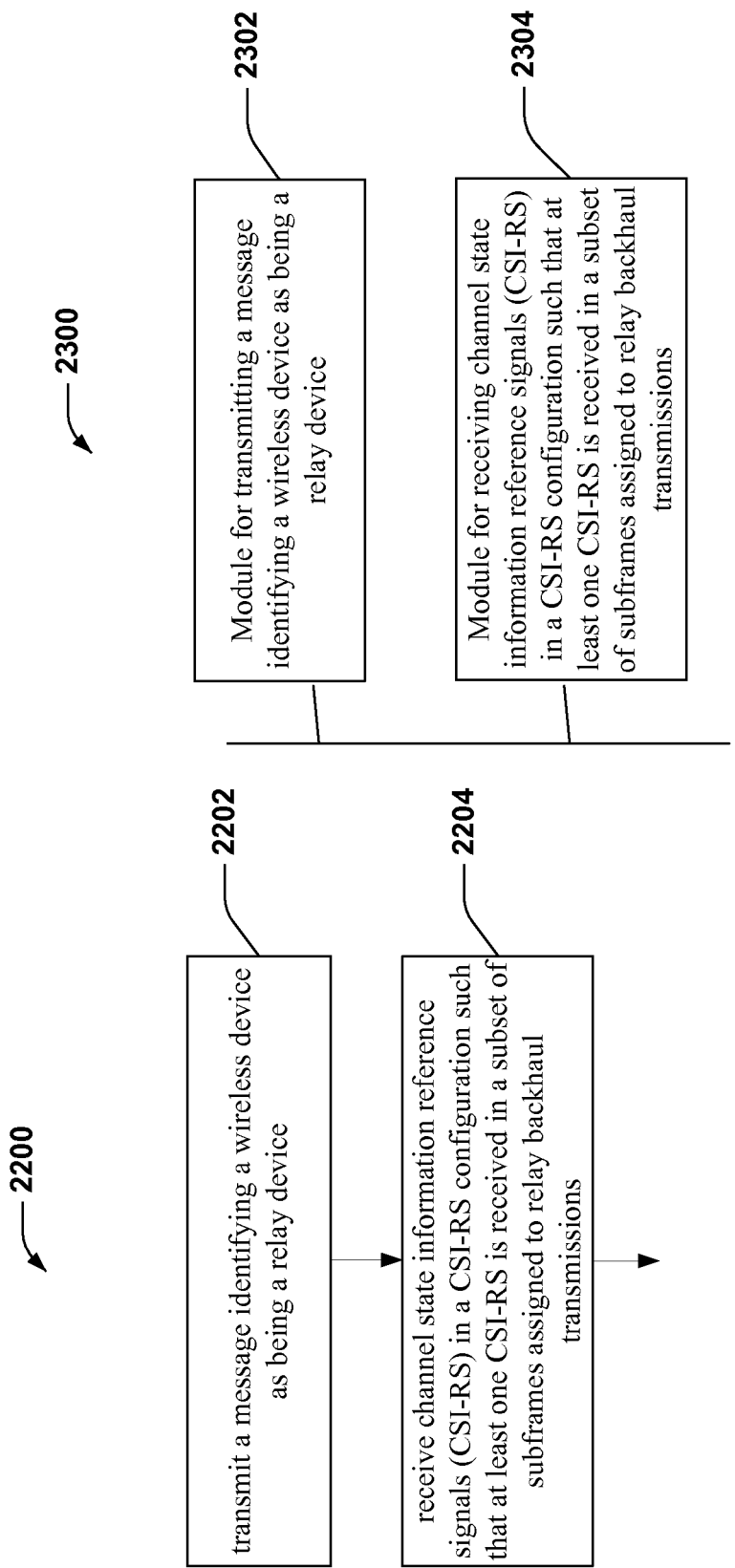

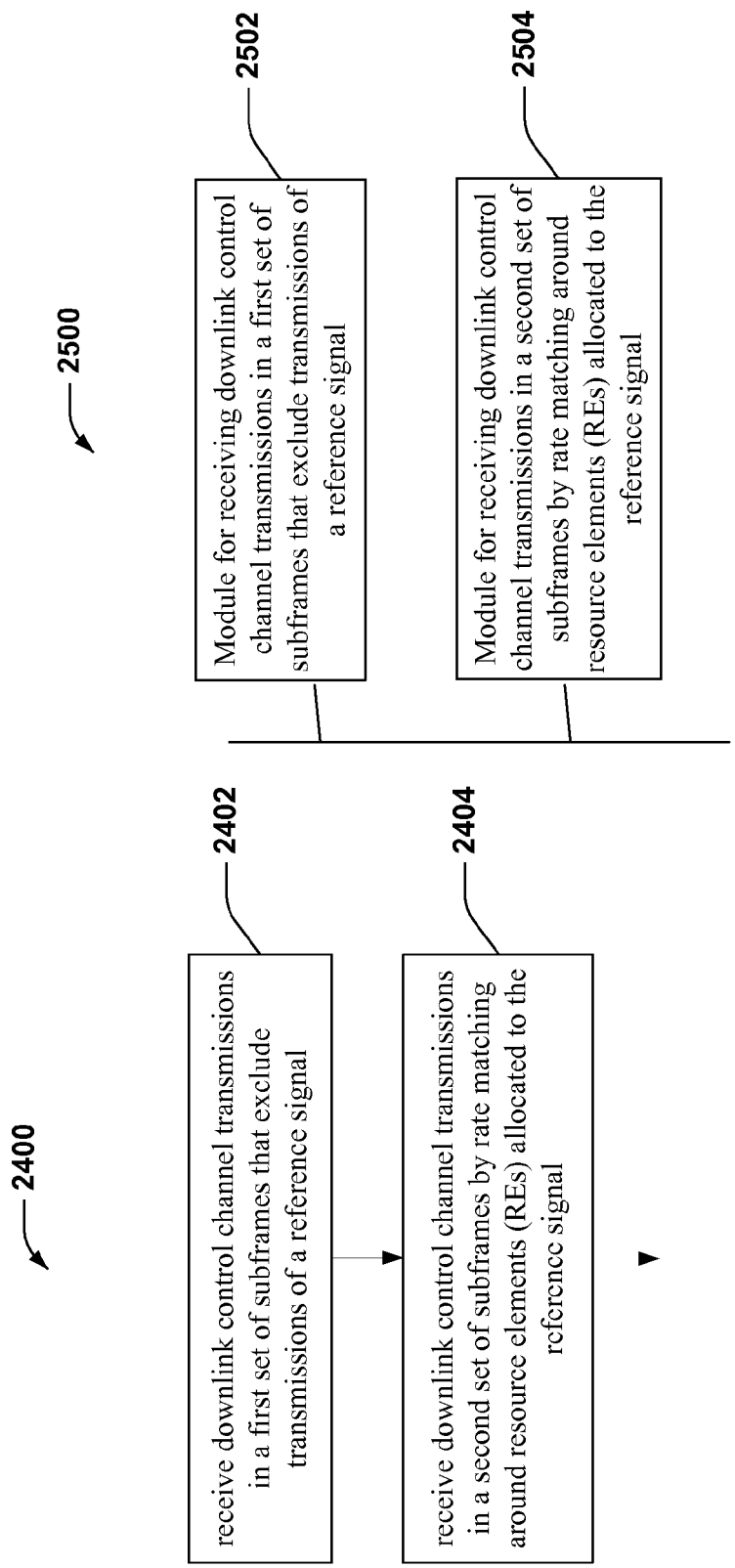

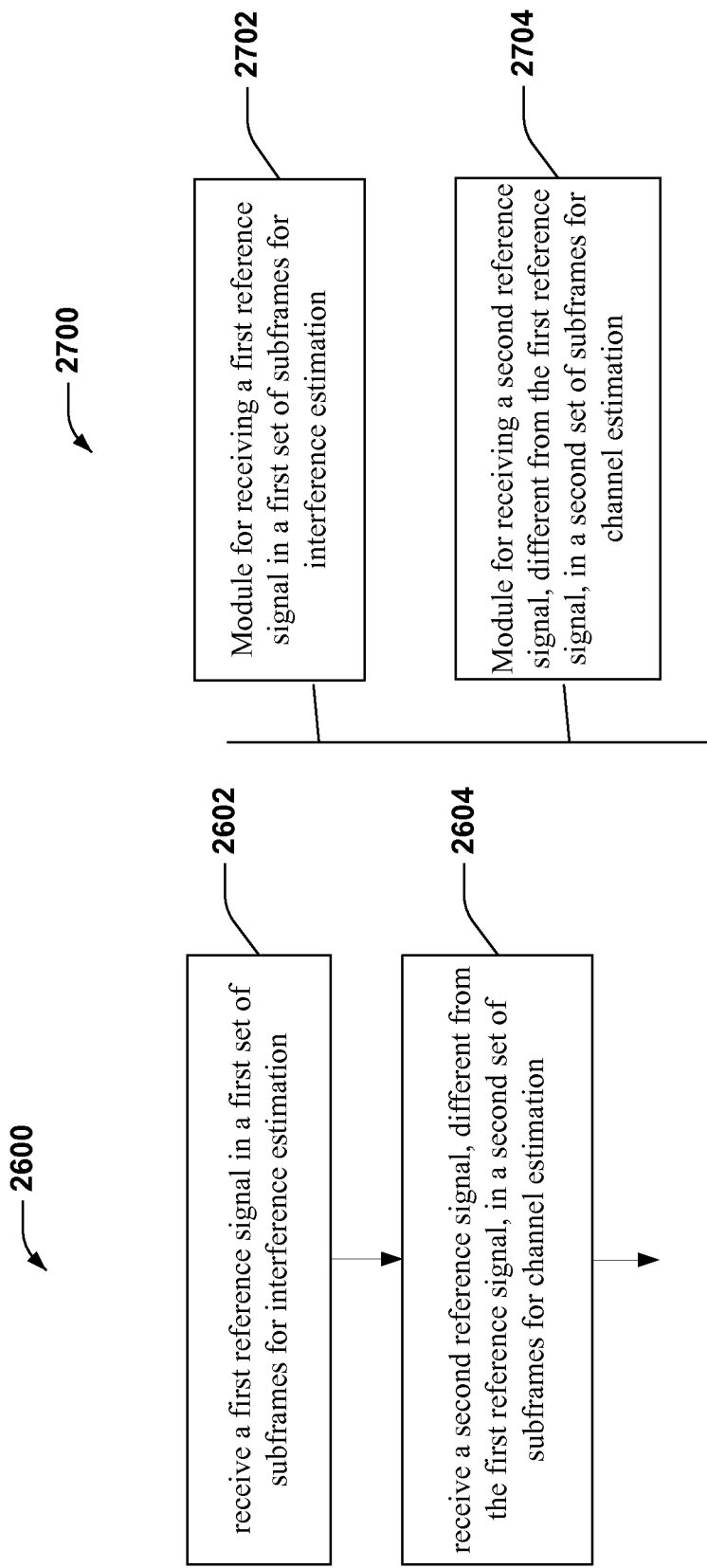

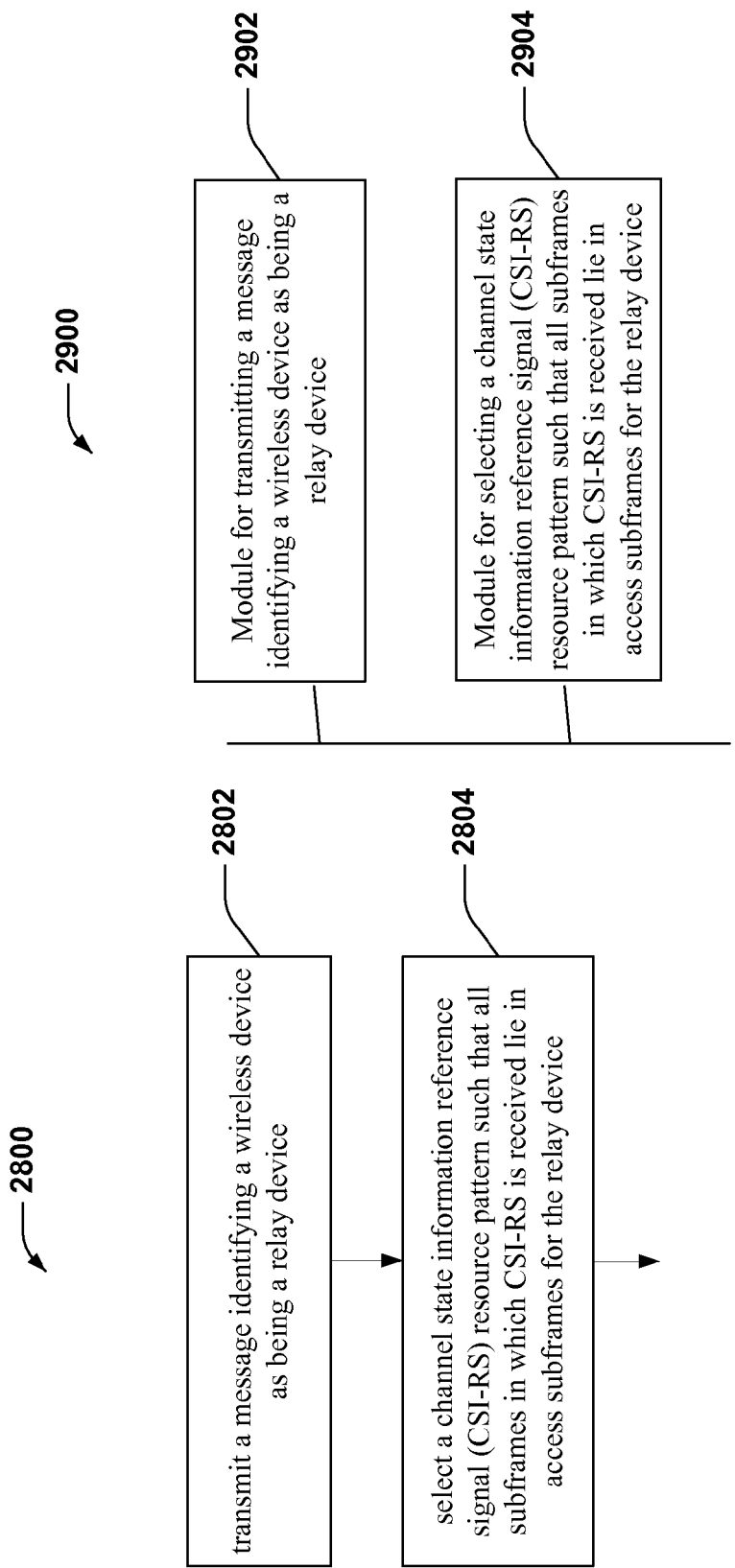

METHOD AND APPARATUSES FOR USING CHANNEL STATE INFORMATION REFERENCE SIGNALS

CROSS-REFERENCE TO RELATED APPLICATIONS

This application is a divisional application of U.S. patent application Ser. No. 13/100,215, entitled "METHODS AND APPARATUSES FOR USING CHANNEL STATE INFORMATION REFERENCE SIGNALS," filed May 3, 2011, which claims the benefit of priority from U.S. Provisional Patent Application Ser. No. 61/331,346, entitled "CHANNEL STATE INFORMATION REFERENCE SIGNALS," filed on May 4, 2010, which is herein incorporated by reference in its entirety.

BACKGROUND

I. Field

The following description relates generally to wireless communications, and more particularly, but not limited to, using channel state information reference signals in a wireless communication system.

II. Relevant Background

Wireless communication systems are widely deployed to provide various types of communication content such as voice, data, and so on. These systems may be multiple-access systems capable of supporting communication with multiple terminals by sharing the available system resources (e.g., bandwidth and transmit power). Each terminal communicates with one or more base stations via transmissions on the forward and the reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A wireless network may also include relays that can improve the coverage and capacity of the wireless network without the need for a potentially expensive wired backhaul link. A relay may be a "decode and forward" station that may receive a signal from an upstream station (e.g., a base station), process the received signal to recover data sent in the signal, generate a relay signal based on the recovered data, and transmit the relay signal to a downstream station (e.g., a user equipment (UE)). A relay may communicate with a base station on a backhaul link and may appear as a UE to the base station. The relay may also communicate with one or more UEs on an access link and may appear as a base station to the UE(s). The relay may be a half-duplex relay that cannot transmit and receive at the same time on the same frequency channel. Hence, the backhaul link and the access link may be time division multiplexed.

In addition, a base station, a relay device or a UE can transmit reference signals to maintain or improve performance of the wireless system. Reference signals are typically signals known a priori to a receiver. A receiving device may receive reference signals and based on the received reference signals may alter certain operational parameters or generate feedback to alter certain operational parameters of wireless communication. The receiving device may also measure or estimate certain operational parameters such as the channel transfer function and interference.

SUMMARY

The systems and methods provided in this disclosure meet the above discussed needs, and others. Briefly and in general terms, in one aspect, the disclosed designs provide methods and apparatuses for the use of channel state information reference signals (CSI-RS). In another aspect, disclosed designs provide methods and apparatuses for the use of reference signals for channel estimation and interference estimation.

In an aspect, a method implemented in a wireless communication system comprises identifying a wireless device as being a relay device and selecting a channel state information reference signal (CSI-RS) configuration such that at least one CSI-RS can be transmitted to the wireless device in a subset of subframes assigned to relay backhaul transmissions.

In another aspect, an apparatus operable in a wireless communication comprises means for identifying a wireless device as being a relay device and means for selecting a channel state information reference signal (CSI-RS) configuration such that at least one CSI-RS can be transmitted to the wireless device in a subset of subframes assigned to relay backhaul transmissions.

In yet another aspect, a computer program product comprising a computer-readable storage medium storing computer-executable instructions is disclosed. The instructions may include code for identifying a wireless device as being a relay device and selecting a channel state information reference signal (CSI-RS) configuration such that at least one CSI-RS can be transmitted to the wireless device in a subset of subframes assigned to relay backhaul transmissions.

In yet another aspect, a processor for wireless communication is disclosed. The processor is configured to identify a wireless device as being a relay device and select a channel state information reference signal (CSI-RS) configuration such that at least one CSI-RS can be transmitted to the wireless device in a subset of subframes assigned to relay backhaul transmissions.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 12B is a block diagram of a resource pattern for two adjacent resource blocks in a wireless communication system.

FIG. 14 is a flow chart of a process for wireless communication.

FIG. 15 is a block diagram of a portion of a wireless communication apparatus.

FIG. 16 is a flow chart of a process for wireless communication.

FIG. 17 is a block diagram of a portion of a wireless communication apparatus.

FIG. 18 is a flow chart of a process for wireless communication.

FIG. 19 is a block diagram of a portion of a wireless communication apparatus

FIG. 22 is a flow chart of a process for wireless communication.

FIG. 23 is a block diagram of a portion of a wireless communication apparatus.

FIG. 24 is a flow chart of a process for wireless communication.

FIG. 25 is a block diagram of a portion of a wireless communication apparatus.

FIG. 26 is a flow chart of a process for wireless communication.

FIG. 27 is a block diagram of a portion of a wireless communication apparatus.

FIG. 28 is a flow chart of a process for wireless communication.

FIG. 29 is a block diagram of a portion of a wireless communication apparatus.

DESCRIPTION

Figure 1:
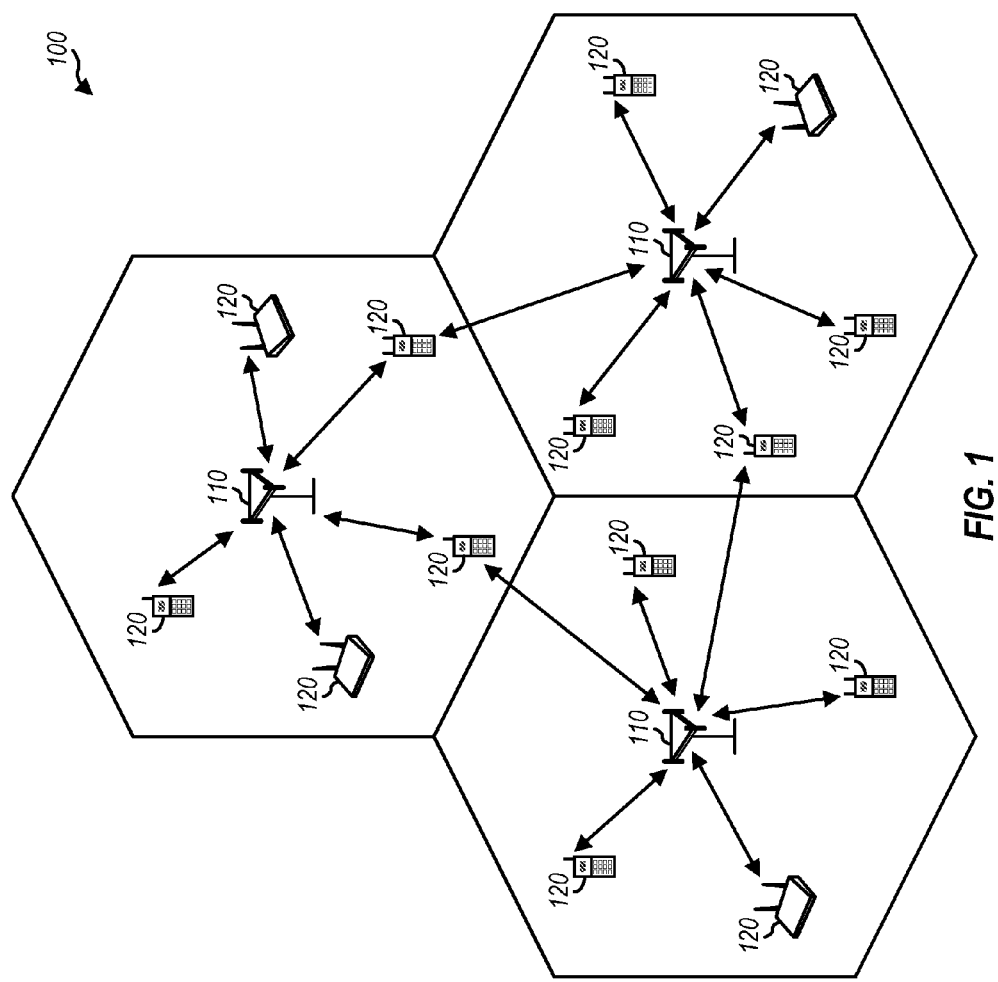
FIG. 1 illustrates a multiple access wireless communication system according to one design.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

Single carrier frequency division multiple access (SC-FDMA) utilizes single carrier modulation and frequency domain equalization. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is used for uplink multiple access scheme in LTE.

It should be noted that for clarity, the subject matter below is discussed with respect to specific examples of certain signals and message formats used in LTE and with respect to the channel state information reference signal (CSI-RS) and muting technology. However, the applicability of the disclosed techniques to other communication systems and other reference signal transmission/reception technology will be appreciated by one of skill in the art.

Furthermore, various combinations of antenna ports and transmission resource assignments are depicted in FIGS. 3 to 11 using a resource block map technique in which a two dimensional plot of available resources in a transmission resource block (RB) are depicted with symbols (or time) along the horizontal direction and frequency (or subcarrier index) along the vertical direction. Furthermore, for the sake of clarity, the resource elements (REs) in each depicted RB are labeled with a corresponding antenna port group/antenna index, which simply represent logical grouping of antennas. However, it is understood that the enumeration using alphabet sequence and numbers is for clarity of explanation only, and may or may not bear any relationship with an actual antenna arrangement on a device.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB 110 and/or an eNB subsystem serving this coverage area.

UEs 120 may be dispersed throughout the system, and each UE 120 may be stationary or mobile. A UE may also be referred to as a mobile station, a terminal, an access terminal, a subscriber unit, a station, etc. A UE 120 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

LTE utilizes orthogonal frequency division multiplexing (OFDM) on the downlink and single-carrier frequency division multiplexing (SC-FDM) on the uplink. OFDM and SC-FDM partition a frequency range into multiple ($K_s$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($K_s$) may be dependent on the system bandwidth. For example, $K_s$ may be equal to 128, 256, 512, 1024 or 2048 for system bandwidth of 1.25, 2.5, 5, 10 or 20 mega-Hertz (MHz), respectively. The system bandwidth may correspond to a subset of the $K_s$ total subcarriers.

Figure 2:
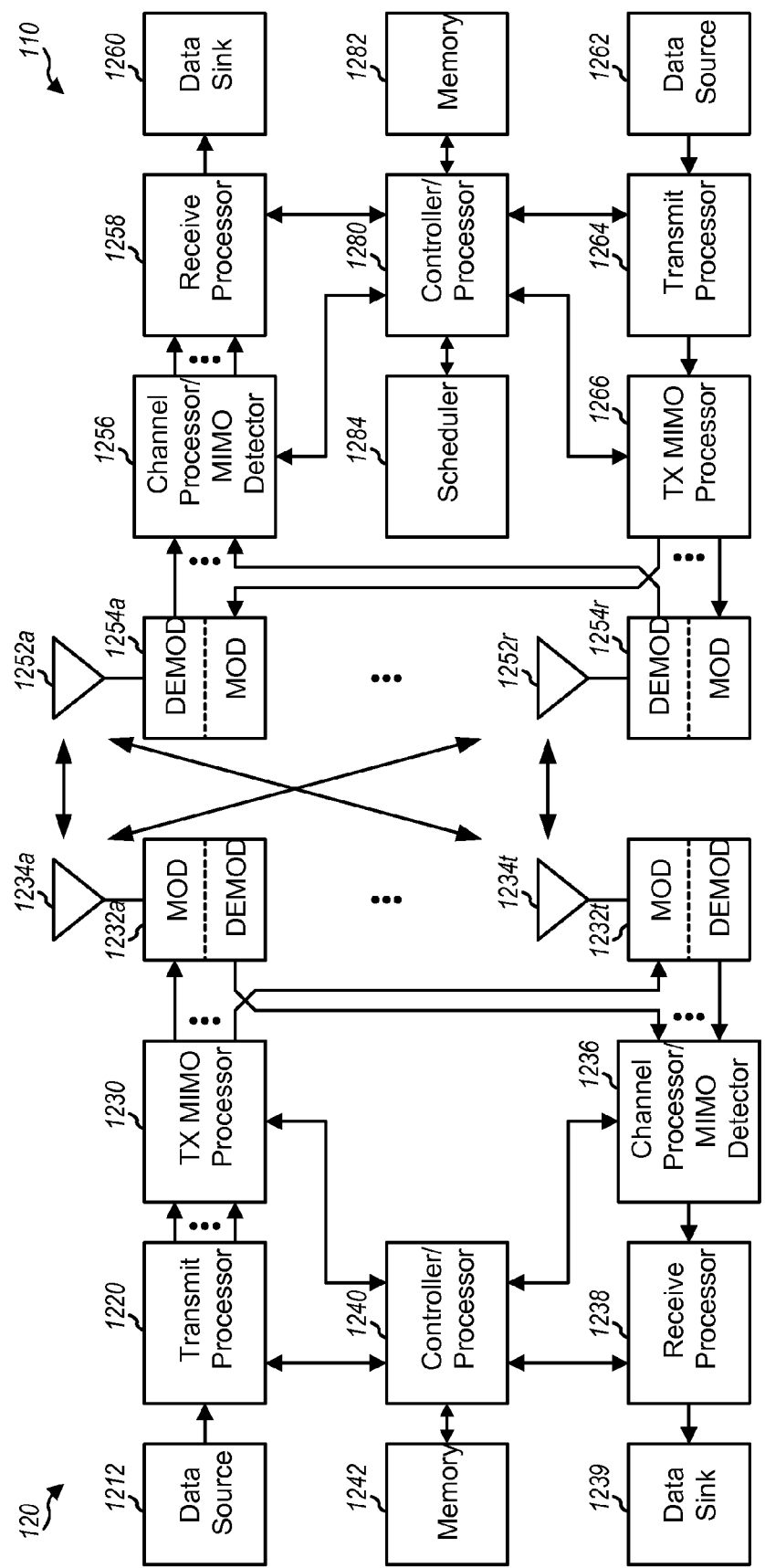
FIG. 2 illustrates a block diagram of a communication system.

FIG. 2 shows a block diagram of an exemplary base station/eNB 110 and a UE 120, which may be one of the eNBs and one of the UEs in FIG. 1. A UE 120 may be equipped with T antennas 1234a through 1234t, and base station 110 may be equipped with R antennas 1252a through 1252r, where in general T≥1 and R≥1.

At UE 120, a transmit processor 1220 may receive data from a data source 1212 and control information from a controller/processor 1240. Transmit processor 1220 may process (e.g., encode, interleave, and symbol map) the data and control information and may provide data symbols and control symbols, respectively. Transmit processor 1220 may also generate one or more demodulation reference signals for multiple non-contiguous clusters based on one or more RS sequences assigned to UE 120 and may provide reference symbols. A transmit (TX) multiple-input multiple-output (MIMO) processor 1230 may perform spatial processing (e.g., precoding) on the data symbols, the control symbols, and/or the reference symbols from transmit processor 1220, if applicable, and may provide T output symbol streams to T modulators (MODs) 1232a through 1232t. Each modulator 1232 may process a respective output symbol stream (e.g., for SC-FDMA, OFDM, etc.) to obtain an output sample stream. Each modulator 1232 may further process (e.g., convert to analog, amplify, filter, and upconvert) the output sample stream to obtain an uplink signal. T uplink signals from modulators 1232a through 1232t may be transmitted via T antennas 1234a through 1234t, respectively.

At base station 110, antennas 1252a through 1252r may receive the uplink signals from UE 120 and provide received signals to demodulators (DEMODs) 1254a through 1254r, respectively. Each demodulator 1254 may condition (e.g., filter, amplify, downconvert, and digitize) a respective received signal to obtain received samples. Each demodulator 1254 may further process the received samples to obtain received symbols. A channel processor/MIMO detector 1256 may obtain received symbols from all R demodulators 1254a through 1254r. Channel processor 1256 may derive a channel estimate for a wireless channel from UE 120 to base station 110 based on the demodulation reference signals received from UE 120. MIMO detector 1256 may perform MIMO detection/demodulation on the received symbols based on the channel estimate and may provide detected symbols. A receive processor 1258 may process (e.g., symbol demap, deinterleave, and decode) the detected symbols, provide decoded data to a data sink 1260, and provide decoded control information to a controller/processor 1280.

On the downlink, at base station 110, data from a data source 1262 and control information from controller/processor 1280 may be processed by a transmit processor 1264, precoded by a TX MIMO processor 1266 if applicable, conditioned by modulators 1254a through 1254r, and transmitted to UE 120. At UE 120, the downlink signals from base station 110 may be received by antennas 1234, conditioned by demodulators 1232, processed by a channel estimator/MIMO detector 1236, and further processed by a receive processor 1238 to obtain the data and control information sent to UE 120. Processor 1238 may provide the decoded data to a data sink 1239 and the decoded control information to controller/processor 1240.

Controllers/processors 1240 and 1280 may direct the operation at UE 120 and base station 110, respectively. Processor 1220, processor 1240, and/or other processors and modules at UE 120 may perform or direct process 2200 in FIG. 22 or process 2400 in FIG. 24 and/or other processes for the techniques described herein. Processor 1256, processor 1280, and/or other processors and modules at base station 110 may perform or direct processes 1400, 1600, 1800 or 2000 in FIG. 14, 16, 18 or 20 and/or other processes for the techniques described herein. Memories 1242 and 1282 may store data and program codes for UE 120 and base station 110, respectively. A scheduler 1284 may schedule UEs for downlink and/or uplink transmission and may provide allocations of resources (e.g., assignment of multiple non-contiguous clusters, RS sequences for demodulation reference signals, etc.) for the scheduled UEs.

Figure 33:
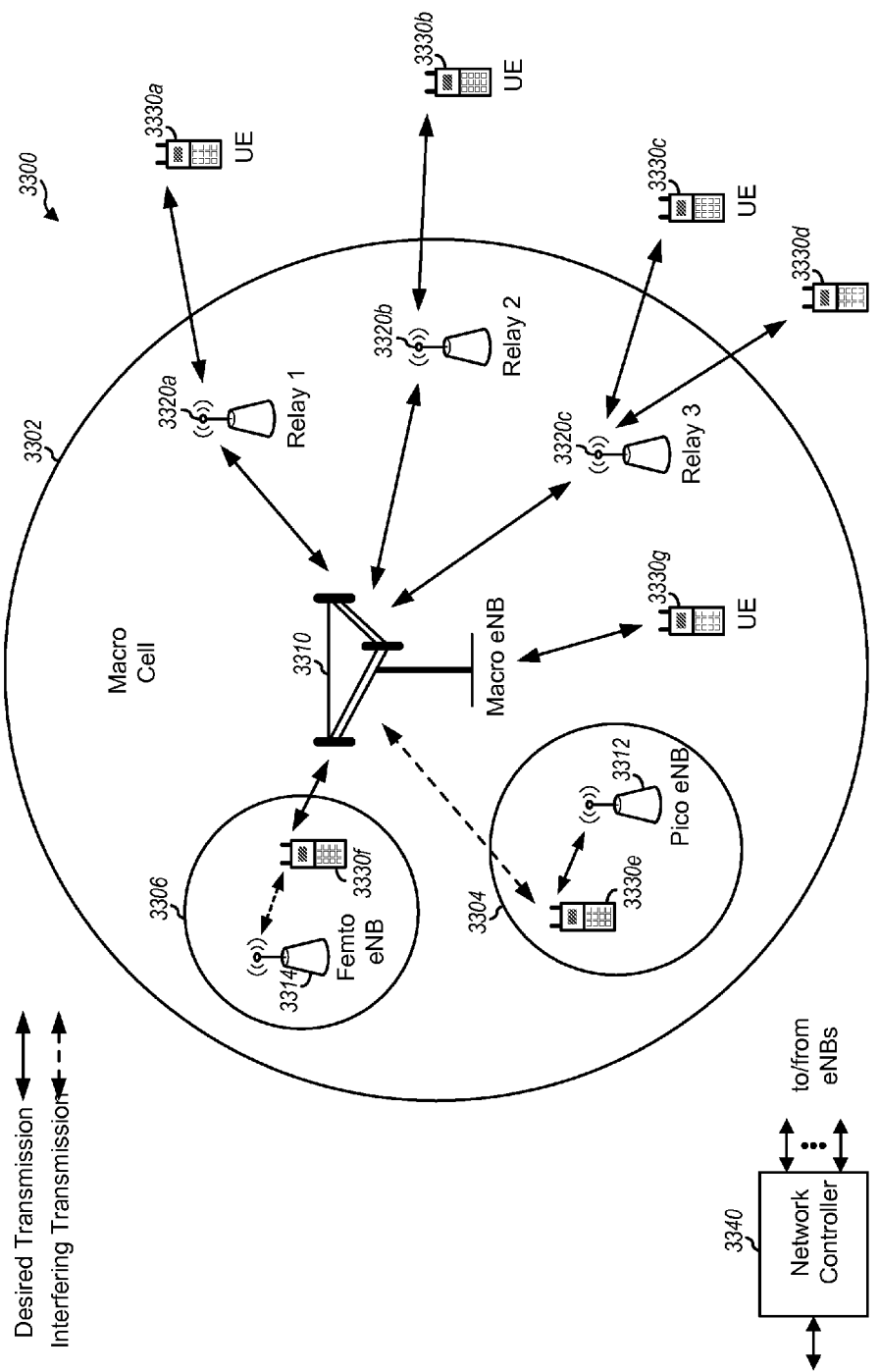
FIG. 33 illustrates a wireless communication network.

FIG. 33 shows a wireless communication network 3300, which may be an LTE network or some other wireless network. Wireless network 3300 may include a number of eNBs (which may be similar in aspects to the previously discussed eNBs 110), relays, and other network entities that can support communication for a number of UEs. An eNB may be an entity that communicates with the UEs and may also be referred to as a base station, a Node B, an access point, etc. An eNB may provide communication coverage for a particular geographic area. In 3GPP, the term "cell" can refer to a coverage area of an eNB and/or an eNB subsystem serving this coverage area, depending on the context in which the term is used. An eNB may support one or multiple (e.g., three) cells.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 33, wireless network 3300 includes a macro eNB 3310 for a macro cell 102, a pico eNB 3312 for a pico cell 3304, and a home eNB (HeNB) 3314 for a femto cell 3306. These eNBs may be similar in aspects to the eNB 110 discussed in detail below. A network controller 3340 may be coupled to a set of eNBs and may provide coordination and control for these eNBs.

A relay may be an entity that receives a transmission of data and/or other information from an upstream station (e.g., an eNB or a UE) and sends a transmission of the data and/or other information to a downstream station (e.g., a UE or an eNB). A relay may also be referred to as a relay station, a relay eNB, etc. A relay may also be a UE that relays transmissions for other UEs. In FIG. 33, relays 3320a, 3320b and 3320c may communicate with eNB 3310 and UEs 3330a, 3330b, 3330c and 3330d in order to facilitate communication between the eNB and the UEs. In some aspects, the UEs 3330a, 3330b, 3330c and 3330d may be similar to the UE 120 previously discussed with respect to FIGS. 1 and 2.

UEs 3330 may be dispersed throughout the wireless network, and each UE may be stationary or mobile. A UE may also be referred to as a terminal, an access terminal, a mobile station, a subscriber unit, a station, etc. A UE may be a cellular phone, a personal digital assistant (PDA), a wireless modem, a wireless communication device, a handheld device, a laptop computer, a wireless local loop (WLL) station, a smart phone, a netbook, a smartbook, a tablet, etc. A UE may be able to communicate with eNBs, relays, other UEs, etc.

Figure 34:
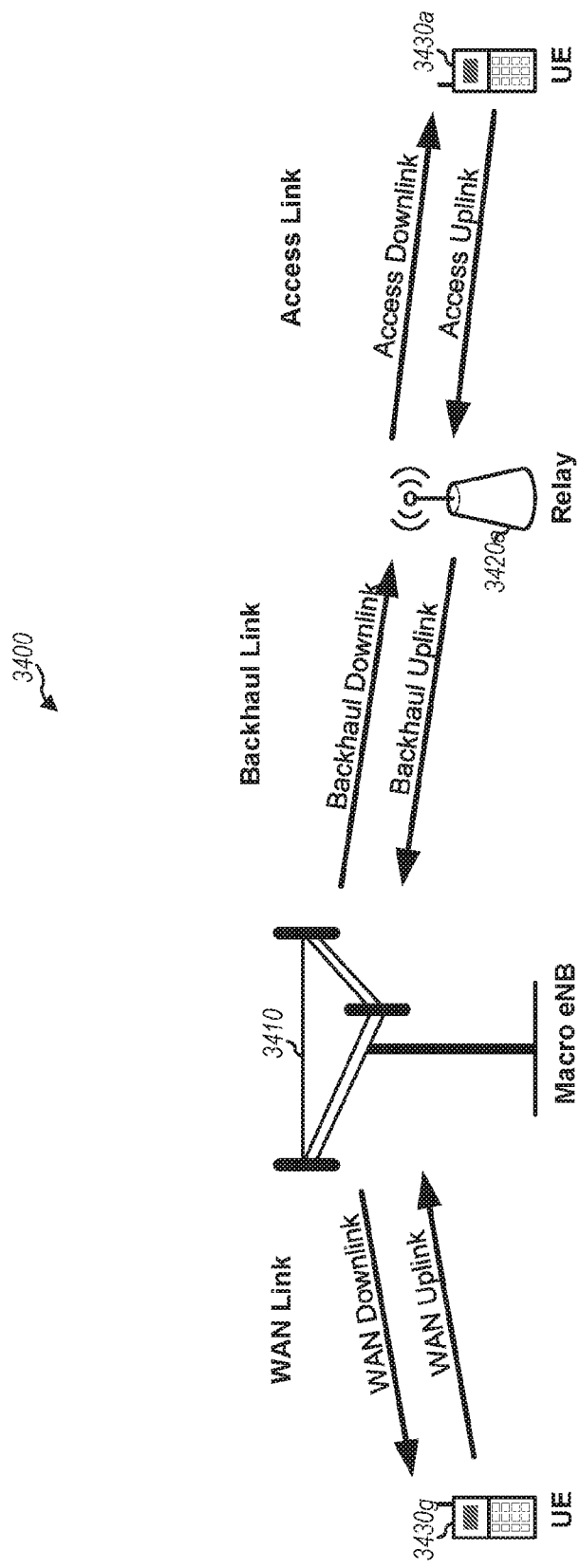
FIG. 34 illustrates communication between a base station and a UE via a relay.

FIG. 34 shows communication between macro eNB 3410 and UE 3430a via relay 3420a. Relay 3420a may communicate with macro eNB 3410 via a backhaul link and may communicate with UE 3430a via an access link. On the backhaul link, relay 3420a may receive downlink transmission from eNB 3410 via a backhaul downlink and may send uplink transmission to eNB 3410 via a backhaul uplink. On the access link, relay 3420a may send downlink transmission to UE 3430a via an access downlink and may receive uplink transmission from UE 3430a via an access uplink. eNB 3410 may be referred to as a donor eNB for relay 3420a.

FIG. 34 also shows direct communication between macro eNB 3410 and a UE 3430g. eNB 3410 may send downlink transmission to UE 3430g via a wide area network (WAN) downlink and may receive uplink transmission from UE 3430g via a WAN uplink.

The wireless network may utilize frequency division duplexing (FDD) or time division duplexing (TDD). For FDD, the downlink and uplink are allocated separate frequency channels. Downlink transmission and uplink transmission may be sent concurrently on the two frequency channels. For TDD, the downlink and uplink share the same frequency channel. Downlink and uplink transmissions may be sent on the same frequency channel in different time intervals.

Figure 35:
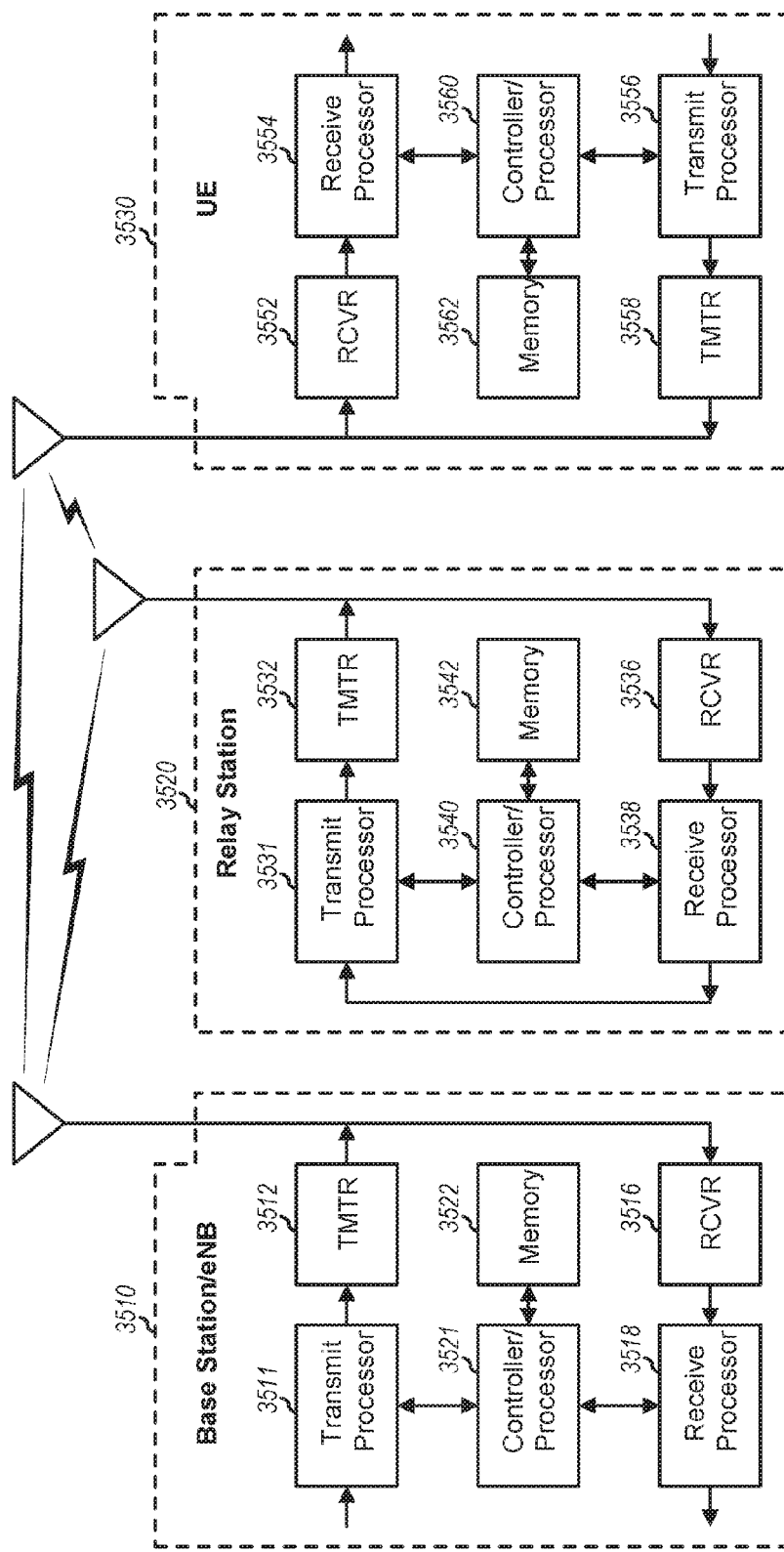
FIG. 35 illustrates a block diagram of a base station, a relay, and a UE.

FIG. 35 shows a block diagram of a of base station/eNB 3510, relay 3520, and UE 3530, which may be one of the relays and one of the UEs in FIG. 33. Base station 3510 may send transmissions to one or more UEs on the downlink via relay 3520 and may also receive transmissions from one or more UEs on the uplink via relay 3520. For simplicity, processing for transmissions sent to and received from only UE 3530 is described below.

At base station 3510, a transmit processor 3511 may receive packets of data to send to UE 3530 and may process (e.g., encode and modulate) each packet in accordance with a selected modulation and coding scheme to obtain data symbols. For hybrid automatic repeat request, HARQ, processor 3511 may generate multiple transmissions of each packet and may provide one transmission at a time. Processor 3511 may also process control information to obtain control symbols, generate reference symbols for reference signals, and multiplex the data symbols, the control symbols, and the reference symbols. Processor 3511 may further process the multiplexed symbols (e.g., for OFDM, etc.) to generate output samples. A transmitter (TMTR) 3512 may condition (e.g., convert to analog, amplify, filter, and upconvert) the output samples to generate a downlink signal, which may be transmitted to relay 3520 and UEs.

At relay 3520, the downlink signal from base station 3510 may be received and provided to a receiver (RCVR) 3536. Receiver 3536 may condition (e.g., filter, amplify, downconvert, and digitize) the received signal and provide input samples. A receive processor 3538 may process the input samples (e.g., for OFDM, etc.) to obtain received symbols. Processor 3538 may further process (e.g., demodulate and decode) the received symbols to recover the data and control information sent to UE 3530. The base station 3510 may send data meant for UE 3530 to relay 3520, which may then be sent by the relay 3520 to the UE 3530. In other words, the base station 3510 may not always send the data to the UE 3530 directly. A transmit processor 3531 may process (e.g., encode and modulate) the recovered data and control information from processor 3538 in the same manner as base station 3510 to obtain data symbols and control symbols. Processor 3531 may also generate reference symbols, multiplex the data and control symbols with the reference symbols, and process the multiplexed symbols to obtain output samples. A transmitter 3532 may condition the output samples and generate a downlink relay signal, which may be transmitted to UE 3530.

At UE 3530, the downlink signal from base station 3510 and the downlink relay signal from relay 3520 may be received and conditioned by a receiver 3552, and processed by a receive processor 3554 to recover the data and control information sent to UE 3530. A controller/processor 3560 may generate ACK information for correctly decoded packets. Data and control information (e.g., ACK information) to be sent on the uplink may be processed by a transmit processor 3556 and conditioned by a transmitter 3558 to generate an uplink signal, which may be transmitted to relay 3520.

At relay 3520, the uplink signal from UE 3530 may be received and conditioned by receiver 3536, and processed by receive processor 3538 to recover the data and control information sent by UE 3530. The recovered data and control information may be processed by transmit processor 3531 and conditioned by transmitter 3532 to generate an uplink relay signal, which may be transmitted to base station 3510. At base station 3510, the uplink relay signal from relay 3520 may be received and conditioned by a receiver 3516, and processed by a receive processor 3518 to recover the data and control information sent by UE 3530 via relay 3520. A controller/processor 3521 may control transmission of data based on the control information from UE 3530.

Controllers/processors 3521, 3540 and 3560 may direct operation at base station 3510, relay 3520, and UE 3530, respectively. Controller/processor 3521 may perform or direct processes for the techniques described herein. Controller/processor 3540 may perform or direct processes for the techniques described herein. Controller/processor 3560 may perform or direct processes for the techniques described herein. Memories 3522, 3542, and 3562, may store data and program codes for base station 3510, relay 3520, and UE 3530, respectively.

In Long Term Evolution Advanced (LTE-A) a new reference signal, called channel state information reference signal (CSI-RS) is introduced. In LTE-A, CSI-RS may be used for channel measurements and for deriving feedback on channel quality and spatial properties as needed. The feedback based on CSI-RS may be used for different transmission modes such as single-cell single-user and multi-user MIMO, as well as coordinated multi-cell transmission. The CSI-RS pattern may be used for heterogeneous networks. Therefore, designs may utilize CSI-RS to support all these transmission modes. Some designs, e.g., LTE-A, may exhibit the following features: (1) CSI-RS punctures the data region in normal and multicast broadcast single frequency network (MBSFN) subframes, (2) CSI-RS structure is sparse in time and frequency, and (3) The CSI-RS density is one resource element (RE) per resource block (RB) per antenna port (1RE/RB/Antenna Port) for 2Tx, 4Tx, and 8Tx modes. In some designs, CSI-RS allocation pattern may be cell-specific.

In some designs, CSI-RS may be advantageously used for 8Tx due to difficulties associated with estimating channels for 8 transmit antennas using Common RS (CRS). In some designs, CSI-RS may also be defined for 1Tx, 2Tx and 4Tx antenna port configurations, allowing reducing the number of CRS antenna ports. For example, in some designs 2 CRS ports may be used for 4Tx and 8Tx systems. As LTE-A UEs 120 may use CSI-RS for CSI and may use UE-specific RS (UE-RS) for data demodulation, the use of CRS may be limited to control and measurement purposes and a 2-CRS configuration may be sufficient. The reduced number of CRS may impact previously released UE 120 performance but can make newer (e.g., LTE-A) system design easier as the number of CRS is reduced (for example, in Heterogeneous Networks and Relays) and can improve LTE-A performance as LTE-A UEs 120 become ubiquitous. In one aspect, this also enables the use of more REs for CSI-RS.

In some designs, REs allocated to CSI-RS transmissions (including REs where CSI-RS transmissions may be muted), referred herein as CSI-RS REs, in a cell may avoid symbols in which CRS is transmitted in addition to CRS REs of that cell. Such a CSI-RS configuration has the advantage that not only are collisions with CRS of neighboring cells in synchronous networks avoided, but also available power may be maximized, in case CRS is power boosted. In some designs, the CSI-RS RE pattern may lie in the physical downlink shared channel (PDSCH) region. In some designs, to make the location of CSI-RS REs independent of the control region size, the first 3 OFDM symbols may be avoided. In some bandwidth-limited designs, such as a 1.4 MHz LTE system, CSI-RS in a 4th OFDM symbol may have to be dropped dynamically, to make room for data transmissions. In some designs, CSI-RS may be allocated transmission resource by avoiding RES allocated to physical broadcast channel (PBCH) and synchronization signals. In some designs, CSI-RS REs may be selected by avoiding REs allocated to UE-RS transmissions. For example, in some designs, CSI-RS RE pattern may be non-overlapping with LTE Release 9/10 UE-RS patterns.

In some designs, OFDM symbols that contain antenna port 5 UE-RS symbols (transmission mode 7) may not be used for CSI-RS transmissions to enable power boosting of UE-RS. In some designs, a large set of enumerated possible CSI-RS resources may be made available to devices and in particular deployments certain subsets may be elected for CSI-RS transmission. A deployment that is configured not to use 'antenna port 5' OFDM symbols for CSI-RS transmission may do so by simply selecting the other CSI-RS resources from the set.

As discussed above, in some designs, the CSI-RS frequency density may be 1RE/RB/Antenna port for all cases 2Tx, 4Tx and 8Tx. In one aspect, this density may be low enough so as minimize the impact to legacy UEs 120 due to the data puncturing, yet at the same time the density may be high enough to provide sufficient channel estimation quality for channel state information purposes. While it may be possible to subsample the CSI-RS resource pattern across RBs (e.g., increasing density in some RBs while removing them from others) to increase the number of RBs that have no CSI-RS, it may be advantageous to maintain a uniform pattern across RBs. In one aspect, because subsampling does not necessarily provide an improvement in performance, the increased density of CSI-RS on some RBs may experience detriment in data transmission performance to legacy UEs 120 in such RBs. In one aspect, a uniform pattern across RBs may simplify channel estimation and may be more implementation friendly.

In some designs, the duty cycle of the CSI-RS patterns may be configurable in a (semi)static way to a limited set of values, e.g., {5, 10, 20} ms. The actual configured value may be conveyed to the LTE-A UEs 120 through higher layer signaling. In some designs, the same duty cycle may be used by all the CSI-RS ports defined in a cell as opposed to defining it on a per CSI-RS antenna port basis.

In some designs, the same CSI-RS pattern may be used for MBSFN and unicast subframes. In some designs, CSI-RS RE locations and sequence may be a function of the physical cell ID and the number of CSI-RS antenna ports. In some designs, CSI-RS RE locations may be indicated with a signaled index from a predefined and enumerated set CSI-RS pattern set, which could also depend on the number of CSI-RS antenna ports and the operational system bandwidth.

In some designs, CSI-RS resource patterns allocated to different antenna ports of the same cell may be orthogonally multiplexed (e.g., using frequency domain multiplexing or time domain multiplexing). In order to fully utilize the power on CSI-RS REs, in some designs, it may be ensured that each OFDM symbol containing CSI-RS may also contain CSI-RS of all antenna ports. In some designs, CSI-RS RE locations of any antenna port may be uniformly spaced in frequency to simplify channel estimation. In some designs, the CSI-RS RE locations of a given antenna port may be placed on evenly spaced subcarriers in one given OFDM symbol.

In some designs, CSI-RS transmissions for different antenna ports of the same cell or CSI-RS transmissions across different cells could be transmitted in different subframes to reduce the collision rate of CSI-RS for different cells and provide more flexibility in the placement and pattern design. However, because puncturing the data region of legacy UEs 120 in multiple sub-frames may incur larger system performance loss, in some designs the impact of puncturing legacy UEs 120 data region may be limited to the least number of sub-frames so that eNBs 110 can schedule legacy UEs 120 around those subframes.

It may be appreciated that spreading CSI-RS transmissions over a number of subframes may impact DRX mode operation because for measuring CSI-RS from multiple cells or different antenna ports in different subframes a UE 120 may experience an increased wakeup duty cycle which may result in a reduced battery life. In some designs, the computation of the feedback based on CSI-RS may be more complex because the computation may be carried out across multiple subframes. To alleviate the computational burden, in some designs CSI-RS transmissions from different cells may be restricted to a limited number of subframes, referred to as CSI-RS subframes. The number of CSI-RS subframes can be based on the desired CSI-RS collision rate across different cells. In some designs, subframes that include PBCH, sync signals or paging within a radio frame may be excluded from the CSI-RS subframe set, i.e. subframes {0, 4, 5, 9} in frequency domain duplexed (FDD) mode.

Based on the above-discussed and other reasons and because a large number of antenna ports that can be multiplexed in a given RB, in some designs, all CSI-RS REs for one cell may lie in the same subframe while CSI-RS REs across cells may be limited to a few subframes in a synchronous network. To simplify implementations, in some designs, special subframes in frame structure 2 may not be used to carry CSI-RS. It will be appreciated that because the number of control symbols is limited to two in special subframes and the third symbol carries the primary synchronization signal (PSS) and therefore excluded from CSI-RS transmissions, it may still be possible to fit CSI-RS after the first three OFDM symbols.

In some designs, CSI-RS pattern may be chosen to hop over time. In conventional systems REs allocated to reference signal transmissions are static or non-hopping over time. Therefore, if CRS transmissions of two neighboring cells collide in one subframe, they will collide in all subframes in which CRS are transmitted. By contrast, CSI-RS RE locations within subframes may be hopped over a period of time. The hopping operation may beneficial in a heterogeneous network, e.g., for estimating the interference (which is beneficial in partial loading scenarios), and ensuring randomization of the collision across CSI-RS transmissions of different cells. It is in particular important in situations of CSI-RS collisions with dominant interferer cells. In various designs, hopping patterns may be chosen as a function of the system time, the antenna port index, the physical cell ID, and so on. In some designs, a given CSI-RS antenna port can be assigned different REs in each subframe where the CSI-RS port is present. In some designs, the hopping function may be chosen such that the orthogonality across CSI-RS ports of the same cell may be preserved.

In some designs, when multiple subframes are allocated for CSI-RS transmissions with CSI-RS of each cell contained in one or few subframes, the subframes containing CSI-RS antenna ports of a cell may be hopped within the CSI-RS subframe set over time to reduce the collision rate even further. For example, in some designs, all CSI-RS for all antenna ports in a duty cycle may be present in one subframe chosen from the CSI-RS subframe set and the index of this subframe may hop over time depending on one or more of: the cell ID, number of CSI-RS antenna ports, number of CSI-RS subframes, and system time. It will be appreciated that, in one aspect, such an approach may reduce the collision rate as CSI-RS of different cells may be present in different subframes over time. At the same time the adverse impact on legacy UEs 120 may be limited to a minimum number of subframes. Furthermore, the computation complexity of feedback computation may also be limited to a minimum number of subframes.

In some designs, such as coordinated multi-point (CoMP) systems, the use of joint transmissions may require UE 120 to monitor a large number of cells within its CoMP measurement set. Likewise, a large number of cells may need to be involved in joint transmission in order to see attractive cell edge and average gains in throughput. Since joint transmission cannot be carried out on the REs that overlap with CSI-RS, the total number of REs available for joint transmission may be limited as the number of cells involved in such joint transmission scales up. Therefore, in some designs, deployment-wide CSI-RS patterns may be beneficial in future wideband wide area network (WWAN) deployments if joint transmission is adopted. A common CSI-RS hopping can be readily achieved within the framework of cell-specific hopping if the value of cell ID in the hopping generation process is replaced by some common default value. In some designs, the hopping mode used by a particular cell may be a 1-bit (semi-)static parameter broadcast by the cell.

Figure 3:
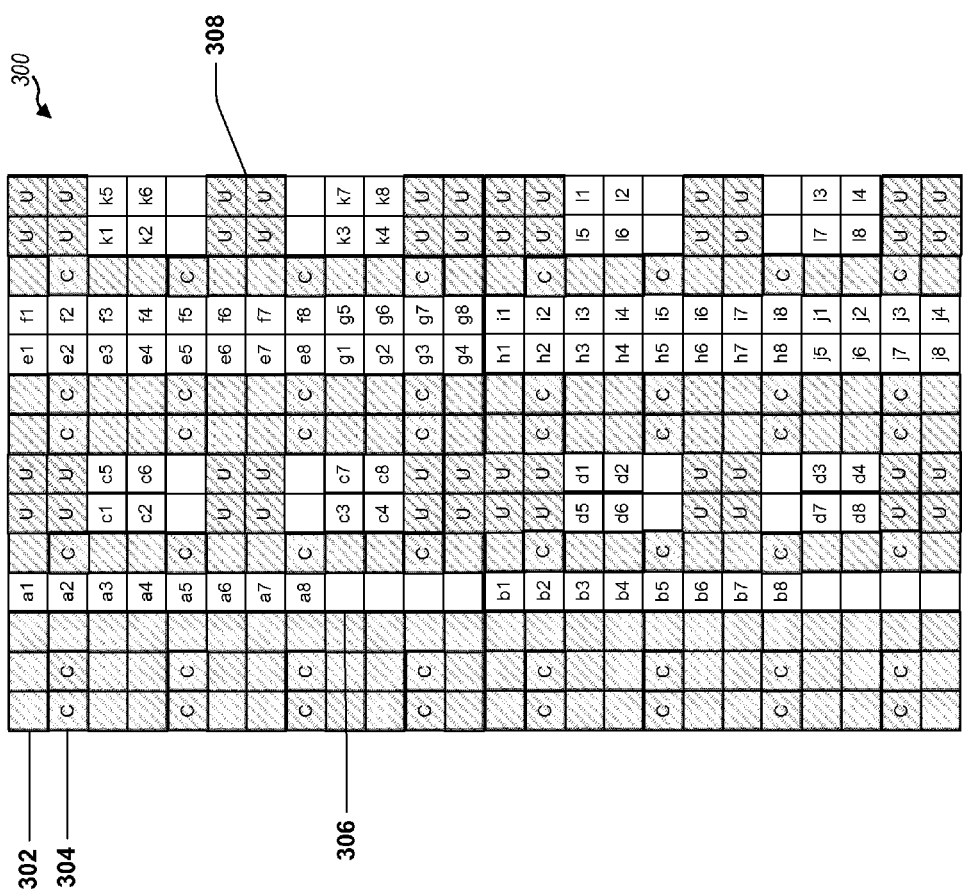
FIG. 3 is a block diagram of a resource pattern for two adjacent resource blocks in a wireless communication system.

FIG. 3 is a block diagram of a resource pattern 300 for two adjacent resource blocks in a wireless communication system. The resource pattern 300 may be repeated every 2 resource blocks (RBs). The resource pattern 300 is consistent with some design principles discussed above. The allocated REs are labeled using a two character combination of an alphabet (a, b, c, d, e, f, g, h, i, j, k and l) representing a group of antenna ports and a number (1 to 8), representing an antenna port index. The resource pattern 300 may be used in some designs to orthogonally multiplex the CSI-RS of up to 6 cells with 8 CSI-RS antenna ports each in the case of normal CP. (each eNB 110 using one of the six groups a, c, e, f, g and k or b, d, h, i, j and l). Note that some REs may not be available for transmission of CSI-RS. These REs have been marked with filled squares in FIG. 3. The unavailable REs include, for example, REs 302 which may lie in OFDM symbols not used for CSI-RS (e.g., the first three OFDM symbols of a subframe, as previously discussed). The unavailable REs may also include REs 304 allocated to cell-specific common reference signal (CRS), marked with alphabet "C" in FIG. 3, and REs 308 allocated to user equipment reference signal (UE-RS), marked with alphabet "U" in FIG. 3. Certain REs, such as REs 306, may not be used for CSI-RS. Some of the antenna ports assignments change across RBs (e.g., location on REs marked c1, c5 and d5, d1 and k1, k5 and l5, l1) to allow full power boosting of CSI-RS. The resource pattern 300 assumes that a resource density of 1 RE/RB is used for CSI-RS of each antenna port.

Figure 4:
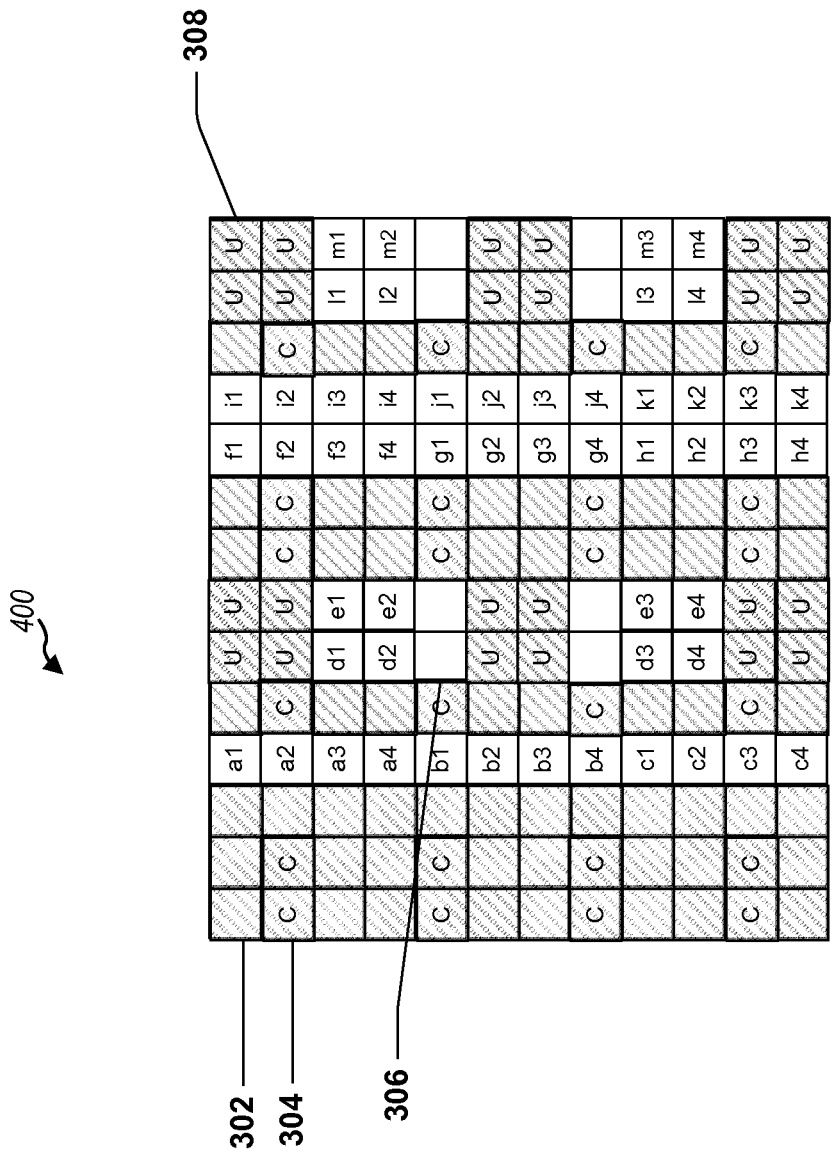
FIG. 4 is a block diagram of a resource block used in a wireless communication system.

FIG. 4 shows a resource pattern 400 which provides an example of how the mapping for eNBs 110 with 8 CSI-RS antenna ports can be split for eNBs 110 with 4 CSI-RS antenna ports. In some designs, the REs carrying CSI-RS of one antenna port may be chosen either on the same OFDM symbol or neighboring OFDM symbol to enable good performance with channel estimation algorithms that do not consider time variations in the channel. In some designs, for 4 CSI-RS antenna ports the pattern may not change across RBs. Also some REs not used for 8 CSI-RS antenna ports may be used for eNBs 110 with 4 CSI-RS antenna ports. Splitting to 2 CSI-RS antenna ports can be done in a similar manner.

Figure 5:
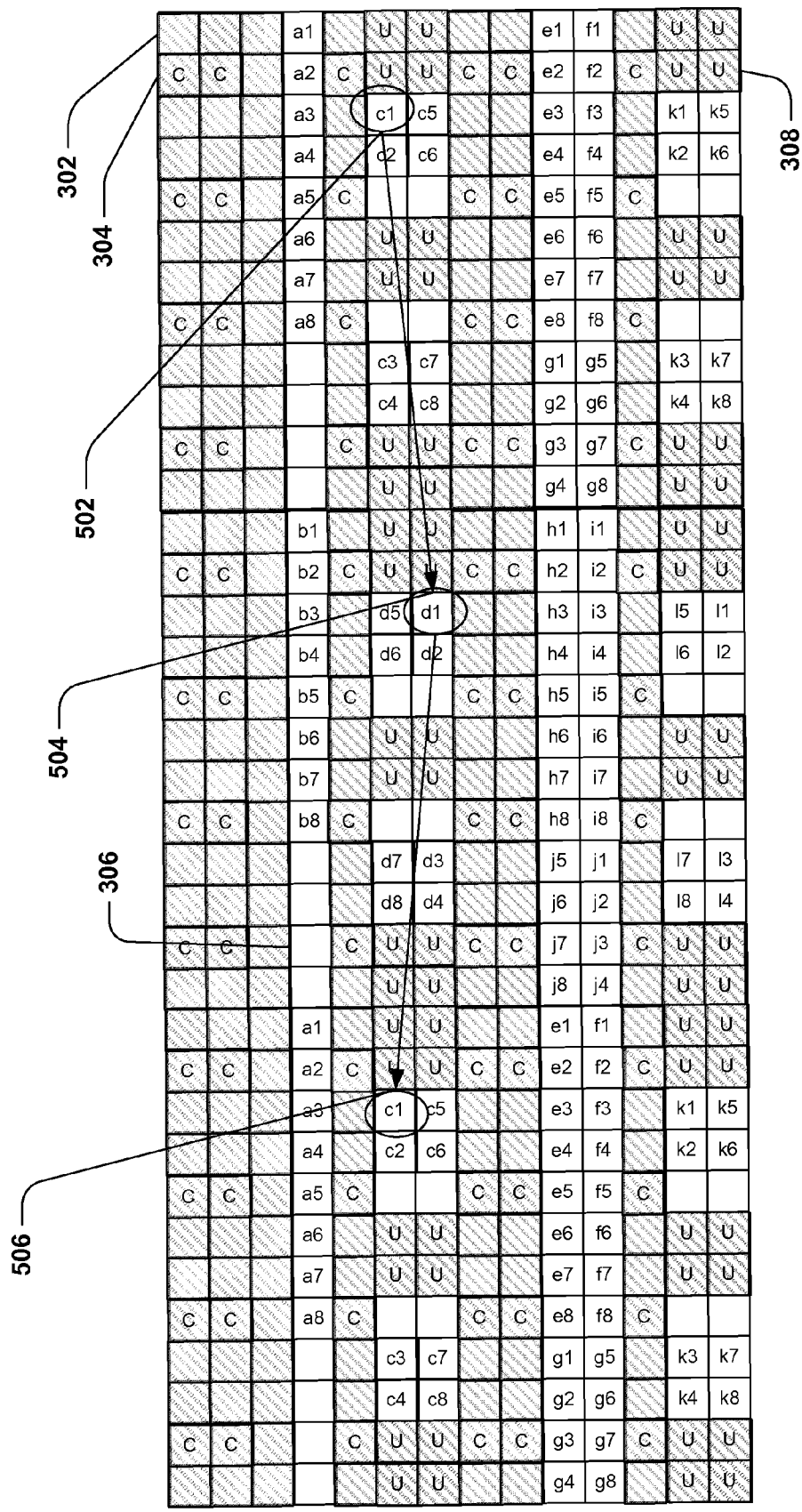
FIG. 5 is a block diagram of a resource pattern for two adjacent resource blocks in a wireless communication system.

FIG. 5 shows a resource pattern 500 for three consecutive RBs, highlighting the above-discussed feature of RE location change across RBs to enable full power utilization. As shown with respect to REs 502, 504 and 506, the above-described feature of changing antenna port assignments across RBs to allow full power boosting of CSI-RS is depicted. It may be seen that the position of antenna port index "1" changes from RE 502 to RE 504, back to RE 506, which occupies the same time-frequency position within its subframe as RE 502.

It may also be noted that, in one aspect, the RE pattern allocated to each antenna port index is chosen such that a multiple of 4 REs on symbols are removed when 4 or 8 CSI-RS antenna ports are defined and a multiple of 2 REs are removed on symbols where 2 or more CSI-RS antenna ports are defined. In one aspect, this property of RE allocation enables rate matching around the CSI-RS REs when used with space frequency block coding/frequency switched transmit diversity (SFBC-FSTD) and SFBC coding without having to deal with unpaired REs. Also from legacy UE 120 performance point of view, RE allocation pattern depicted in FIGS. 3, 4 and 5 may be advantageous because the number of SFBC pairs impacted by puncturing due to CSI-RS is minimized.

Figure 6:
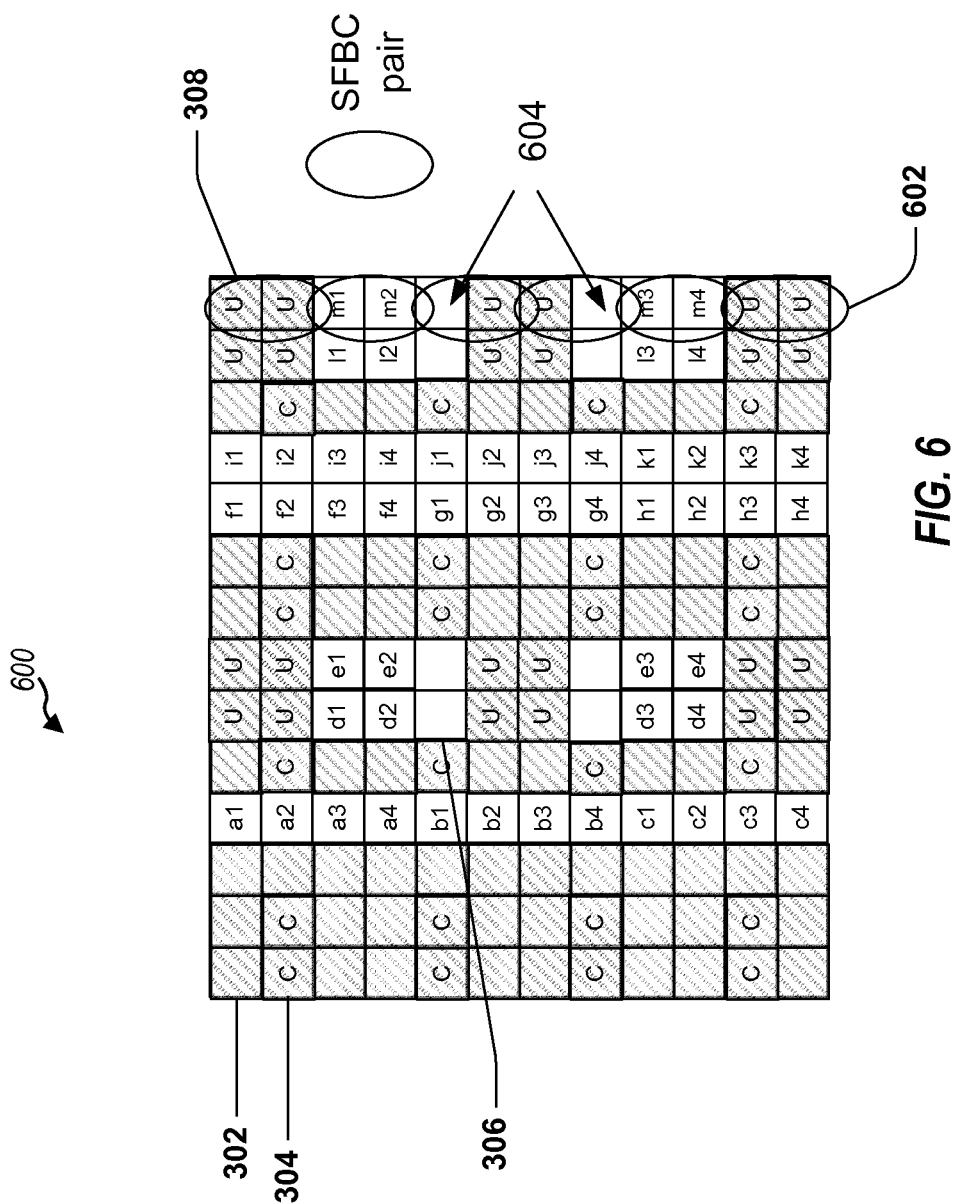
FIG. 6 is a block diagram of a resource block used in a wireless communication system.

FIG. 6 depicts a resource assignment 600, showing SFBC pairing of REs in the last symbol 602. As depicted, REs 604 may be un-assigned to CSI-RS, but may be used to form an SFBC pair for data transmission. A similar method of resource pattern selection is also described in the co-pending U.S. patent application Ser. No. 13/032,592, entitled "Channel State Information Reference Signals," filed on Feb. 22, 2011, the relevant portion of which is incorporated by reference herein.

Referring to the previously discussed operation of relay devices in a wireless communication network, in some designs, among other reasons, to allow for an in-band relay backhaul to utilize all 8Tx antennas, CSI-RS may be specified for the backhaul subframes as well. It will be appreciated that from an eNB's perspective, the CSI-RS configurations (RE patterns) used for transmissions to UEs 120 may in general be different from the CSI-RS RE patterns used for transmissions to relay devices 130. In some designs, CSI-RS may be transmitted in a different set of subframes (regular or relay backhaul subframes) to UEs 120 and to relay devices 130. Therefore, in certain designs, as discussed in greater detail below, CSI-RS RE patterns specific to a relay backhaul deployment may be utilized.

In some designs, subframes used for relay backhaul transmissions may be negotiated between the eNB 110 and the relay device 130 and may be changeable over a long period of time. As previously discussed, CSI-RS resource pattern may be selected at the relay device 130 such that all subframes in which CSI-RS is transmitted by the relay device 130 lie in access subframes for the relay device. Similarly, at the eNB 110, CSI-RS pattern may be selected such that at least some of the subframes in which CSI-RS can be transmitted lie in the relay backhaul subframes of a relay device 130.

Figure 7:
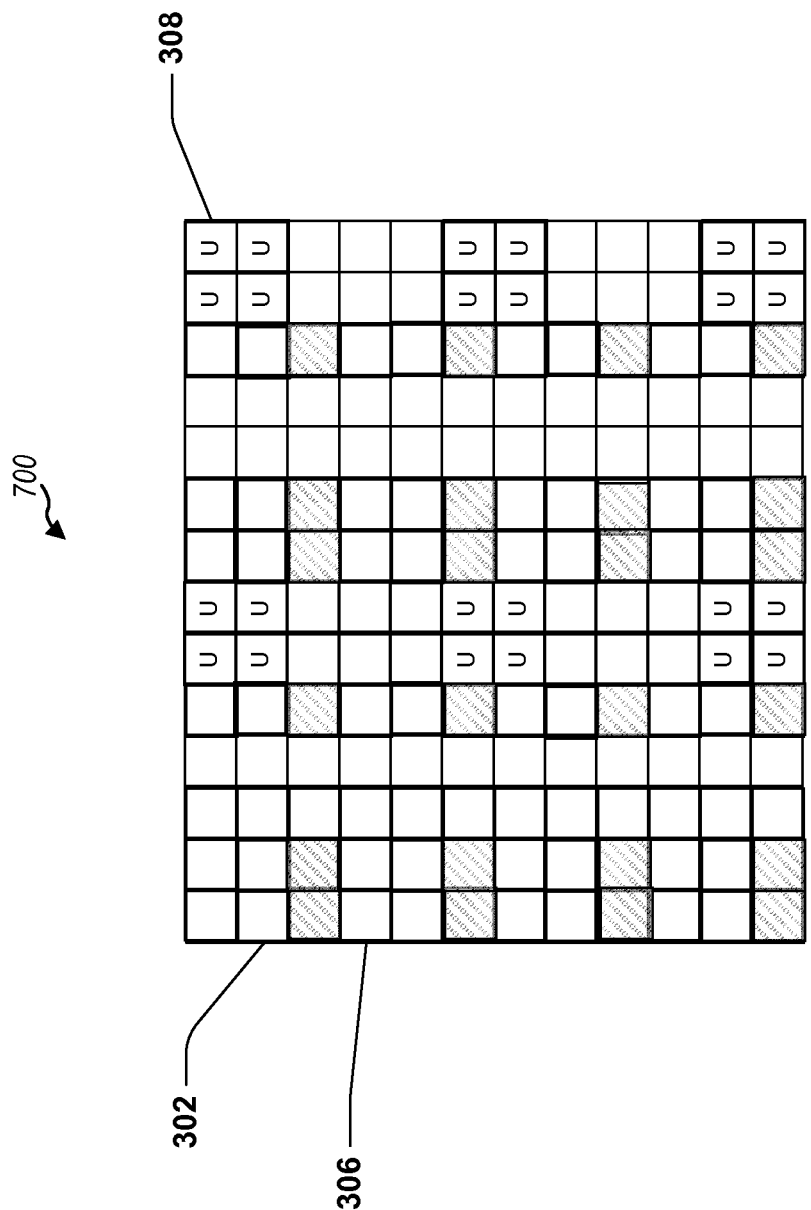
FIG. 7 is a block diagram of a resource block used in a wireless communication system.
Figure 8:
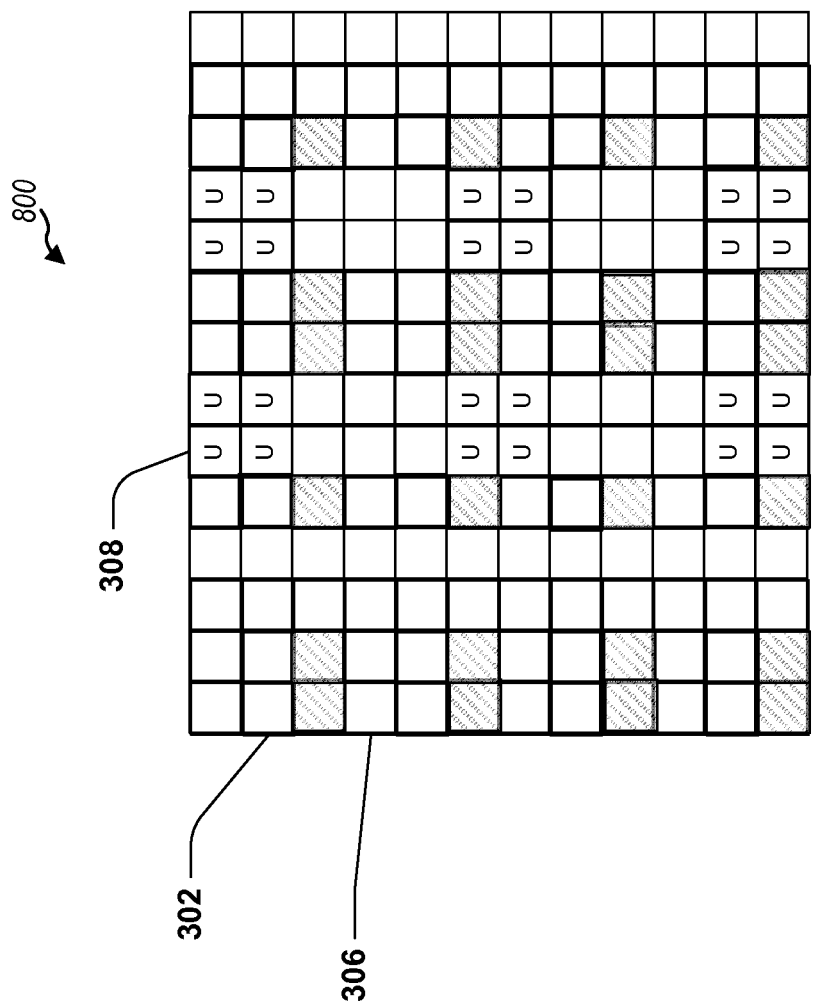
FIG. 8 is a block diagram of a resource block used in a wireless communication system.

Referring to FIG. 7 and FIG. 8, two resource pattern assignments 700 and 800 are shown for using CSI-RS in a wireless network for transmissions to a relay device. For simplicity, particular patterns of UE-RS assignments are depicted in FIG. 7 and FIG. 8. However, the subject technology is not limited to the specific UE-RS patterns depicted in FIGS. 7 and 8. The resource patterns 700 and 800 assume the use of normal CP and regular subframes. FIG. 7 assumes relay timing case 1, while FIG. 8 assumes relay timing case 3. A comparison of the resource patterns 700 and 800 highlights one difference in that the transmission of UE-RS signals in the resource pattern 800 is "pulled in" by avoiding the use of last two symbols in the subframe. Because a relay device 130 may switch between access link/relay link operations on subframe boundaries, it may be possible that the relay device 130 misses out receiving the last one or two symbols in a subframe. Therefore, in some designs, the resource pattern 800 may be used for relay backhaul transmissions.

In FIG. 7, for timing case 1 (when a relay device may not drop the last symbol during switching) in regular downlink (DL) subframes, the available CSI-RS REs in a subframe are similar to those depicted in FIGS. 3 to 6. Therefore, one of the CSI-RS configurations, described with respect to FIGS. 3 to 6 may be used for transmission to a relay device. FIG. 8 depicts a possible UE-RS pattern that could be used for regular DL subframes for timing case 3 (when a relay device may drop last few OFDM symbols during the switching).

In general, the co-existence of reference signals useful for data demodulation, such as UE-RS and reference signals that may be introduced in future wireless systems, may be managed using one or more of the following options that may be applied to backhaul relay subframes: (1) limit CSI-RS REs such that the CSI-RS REs do not collide with UE-RS REs, (2) limit UE-RS patterns to not collide with CSI-RS REs or (3) avoid using UE-RS and use other reference signals (e.g., common references signal), for example, on subframes containing CSI-RS or (4) limit transmission rank with UE-RS based transmissions on CSI-RS subframes such that the lower rank UE-RS pattern and CSI-RS do not collide.

A relay backhaul may be a planned deployment, but the relay device that performs the relaying function may be anywhere in the coverage area of the eNB 110. In a typical relay backhaul configuration, the relay device may however have a good channel (e.g., line-of-sight) with the eNB 110. Therefore, in a typical relay backhaul deployment, optimization options such as precoding, MU-MIMO, aggregation levels may be used. In some designs, where the relay device 130 and the macro eNB 110 (sometimes called the donor eNB 110), are subframe-aligned, the relay 130 may not be able to receive the regular PDCCH since the relay 130 may be required to transmit CRS on the first few OFDM symbols and the regular PDCCH may be transmitted by the donor eNB 110 starting from the first OFDM symbol. A new physical downlink control channel, called R-PDCCH, may be used for relay backhaul using REs in the data region. On subframes that contain both CSI-RS REs and the R-PDCCH, to avoid impacting the CSI-RS, the R-PDCCH may either be punctured or rate matched around CSI-RS. Note that the puncturing of R-PDCCH should be specifically handled as follows. In some designs, R-PDCCH transmissions may therefore be rate matched around CSI-RS REs. In general, R-PDCCH transmissions may be performed in subframes with CSI-RS transmissions and subframes without CSI-RS transmissions and therefore the control data REs used for R-PDCCH may be different on subframes with CSI-RS and without CSI-RS.

Figure 9:
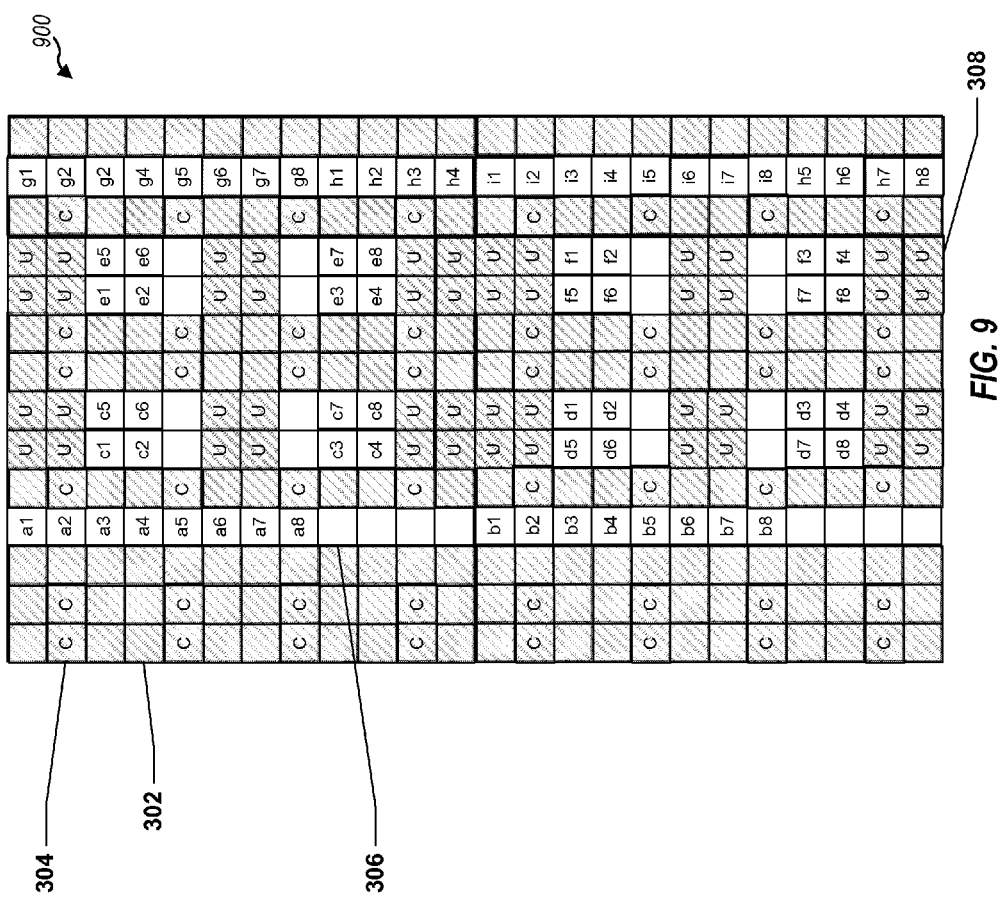
FIG. 9 is a block diagram of a resource pattern for two adjacent resource blocks in a wireless communication system.
Figure 10:
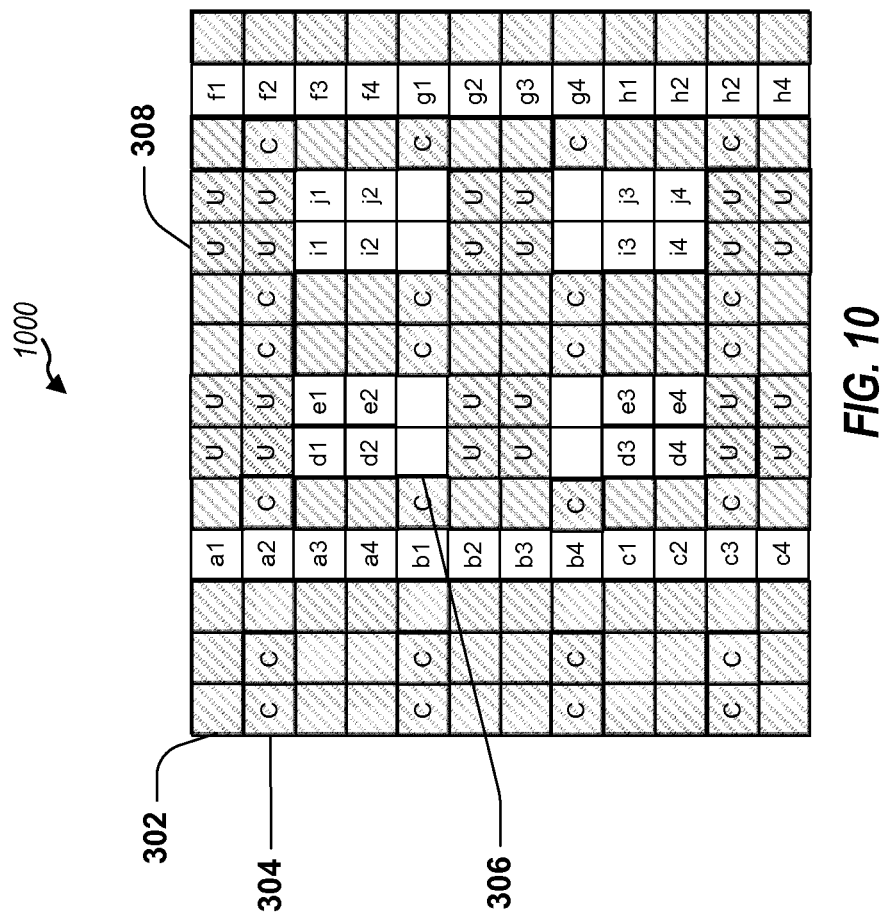
FIG. 10 is a block diagram of a resource block used in a wireless communication system.

Referring to FIG. 9 and FIG. 10, resource patterns 900 and 1000 are disclosed that may be used for timing case 3, for a relay device. FIG. 9 and FIG. 10 depict CSI-RS REs, for 8Tx and 4Tx antenna configurations respectively. The depicted resource pattern 900 may be used for CSI-RS with normal cyclic prefix (CP) in relay backhaul subframes for timing case 3. The depicted resource pattern 900 may be repeated every two subframes. As can be seen from FIG. 9, and FIG. 10 a number of symbols (e.g., the last symbols in the depicted resource patterns 900 and 1000) may not be used for CSI-RS transmissions. In one aspect, a relay device 130 may thus be provided with sufficient time to switch between access link/backhaul link, without losing CSI-RS transmissions. For example, when a wireless device enters a network, the eNB 110 may determine a timing type of the wireless device (e.g., whether the device is a UE or a relay device and whether to use timing case 1 or 3, which indicate whether the relay device may lose a symbol reception during switching, etc.). In some designs, the UE or relay device may transmit a message to the eNB 110, identifying itself. Based on the determined timing type, CSI-RS transmissions may be limited to a subset of symbols in the subframe (e.g., limited to backhaul subframe as depicted in FIGS. 9 and 10) in which CSI-RS is to be transmitted to the device.

In general, it may not be necessary to define two different pattern types, one for UE access and one for relay node backhaul. Instead, in some designs, a 'superset' of patterns may be defined that enumerates all CSI-RS resources, as discussed above. Some of the above-discussed CSI-RS configurations include identical RE patterns and they may not be double counted in the enumeration.

It is also possible that, in certain deployments, the same subframe may be used for UE access to the macro eNB 110 and relay backhaul (in an FDM manner). When timing case 3 is used, then in some designs, only those CSI-RS resources that are common between the pattern listed previously may be used.

In the most restricting case when the deployment is configured to avoid symbols containing antenna port 5 UE-RS and both backhaul and access is used in the same subframe then the CSI-RS resources in symbol #5 and symbol #10 (i.e. 6th and 11th symbols) may be combined to form a single resource for the 8 Tx case. In such designs, only a one-fold CSI-RS reuse would be possible for 8Tx and reuse of two-fold may be possible for 4Tx.

Figure 11:
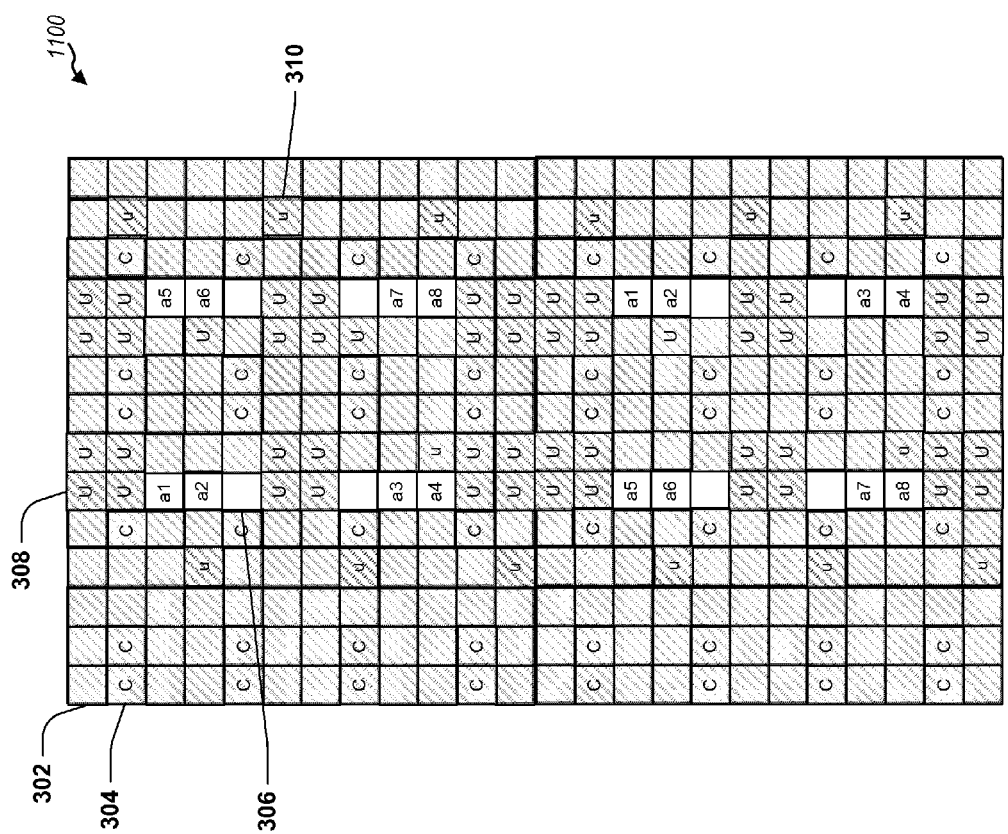
FIG. 11 is a block diagram of a resource pattern for two adjacent resource blocks in a wireless communication system.

FIG. 11 shows a resource pattern 1100 wherein the REs allocated to CSI-RS are restricted as above for 8Tx. The CSI-RS REs depicted in the resource pattern 1100 may be used for CSI-RS transmissions in normal-CP subframes. It will be appreciated that, in one aspect, the resource pattern 1100 avoids the use of antenna port 5 symbols. In another aspect, the REs for a given antenna port hop locations between symbols in the resource pattern 1100. The REs 310, marked with lower case "u" may correspond to UE-RS REs for legacy standards, e.g., Release 8 of LTE.

Figure 12A:
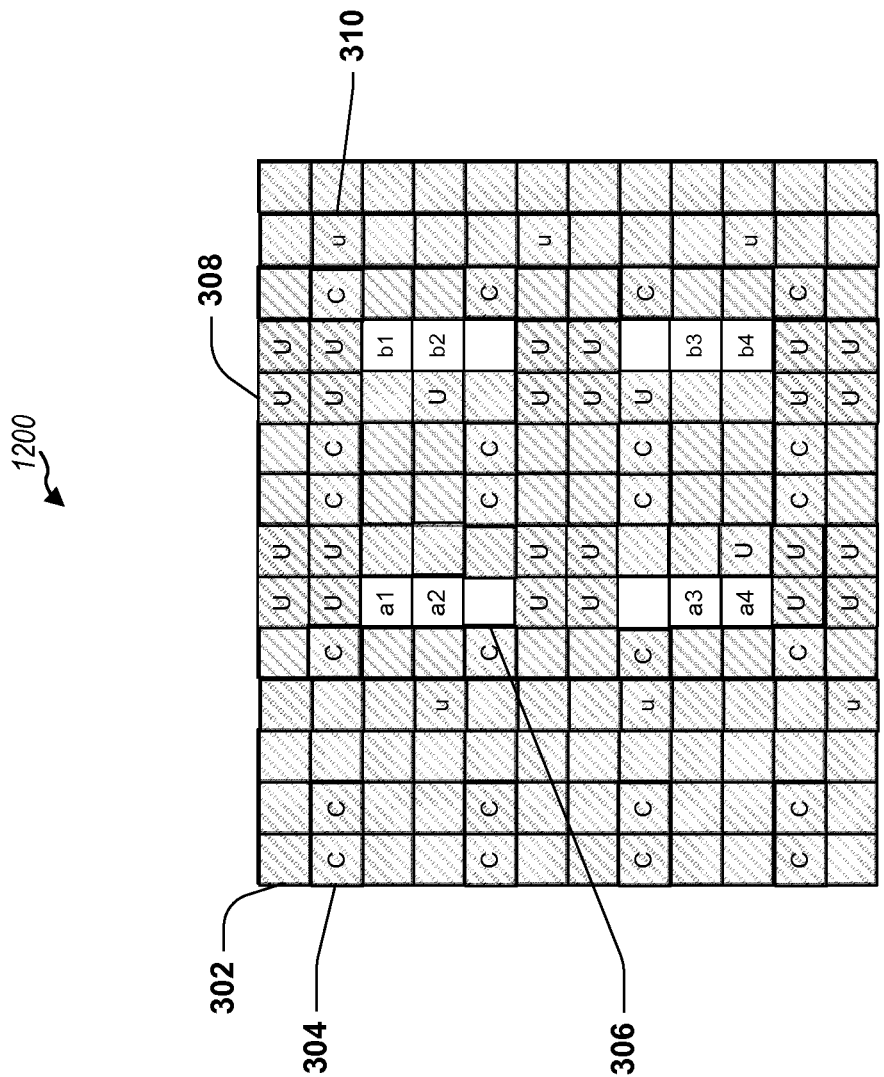
FIG. 12A is a block diagram of a resource block used in a wireless communication system.

FIG. 12A shows a resource pattern 1200 wherein the REs allocated to CSI-RS are restricted as described above for 4Tx configurations. Similar to the resource pattern 1100, the depicted resource pattern 1200 may be used for 4Tx CSI-RS transmissions with normal-CP by avoiding CSI-RS transmissions in antenna port index 5 symbols. It may be noted that the pattern 1200 is a subset of the pattern 1000 shown in FIG. 10 for 4Tx.

FIG. 12B depicts a resource pattern 1250 in which CSI-RS REs allocated to a given antenna port are located within the same OFDM symbol in subframes. In the case of resource pattern 1100 depicted in FIG. 11, the REs corresponding to an antenna port are placed in non-adjacent OFDM symbols. This may create problems in high Doppler scenarios with fast Fourier transform (FFT) based channel estimation processing. In one aspect, the pattern 1250 shown in FIG. 12B may alleviate this problem associated with channel estimation processing in high Doppler scenarios.

Note that a complete CSI-RS resource set that includes all CSI-RS RE patterns discussed in this disclosure may include a set of UE patterns (i.e., CSI-RS patterns that may be used for transmissions to UEs 120) and another set of relay patterns (i.e., CSI-RS patterns that may be used for transmissions to a relay device 130). Some of the UE patterns and relay patterns may be 'colliding' patterns, i.e. patterns that partially or fully overlap considering their RE allocations. In operation, a network deployment may make sure that partially colliding entries are not configured in the same subframe by the same eNB 110. For example, a resource pattern allocated for CSI-RS transmissions to a UE 120 for a given antenna port index may be non-overlapping with a resource pattern allocated for CSI-RS transmissions to a relay for a different antenna port index.

In heterogeneous network (HetNet) deployments, different eNBs 110 may coordinate transmissions of CSI-RS and other reference signals such that interference from each other's reference signal transmission is minimized. For reporting channel quality information (CQI), UEs 120 and relay devices 130 may measure channel quality and also interference from other neighboring eNBs 110.

Under some operational scenarios, using CSI-RS for interference measurement for CQI reporting may not be optimal due to the low density of CSI-RS and due to the muting of CSI-RS of neighboring cells. With muting, the neighboring cell eNB 110 might mute the REs corresponding to CSI-RS REs for the serving cell of an UE 120, thereby causing the UE 120 to not measure the interference caused by the neighboring cell when the neighboring eNB 110 is actually transmitting a signal.

Therefore, in some designs, the CQI reporting may be based on interference estimated using another reference signal, e.g., CRS. In some designs, CRS may be available on all normal subframes and may have a higher density than CSI-RS. Therefore, even when CSI-RS is transmitted on MBSFN subframes, the interference estimate may be obtained from the CRS on the first OFDM symbol (although the control load and PDSCH load might not be the same). In some designs, interference estimates from previous subframes can be used. Hence, in a HetNet context, the interference estimated on CRS, which is expected to be similar to the interference expected on the data tones, may provide sufficient accuracy for CQI reporting purpose.

In HetNet deployments (e.g., as depicted in FIG. 33), if CSI-RS transmissions from different eNBs 3310, 3312 are not orthogonalized (e.g., using muting), it may be difficult to estimate the channel for CQI feedback due to the presence of an interfering signal from another eNB. In deployments, where CSI-RS from different cells are orthogonalized in a manner similar to data, it may be possible to use CSI-RS for interference estimation since CSI-RS will experience the same interference as data. Similarly, CRS based interference estimation may also possible when the UE 120 is informed in which resources (subframes) the interference estimation should be made.

Figure 13:
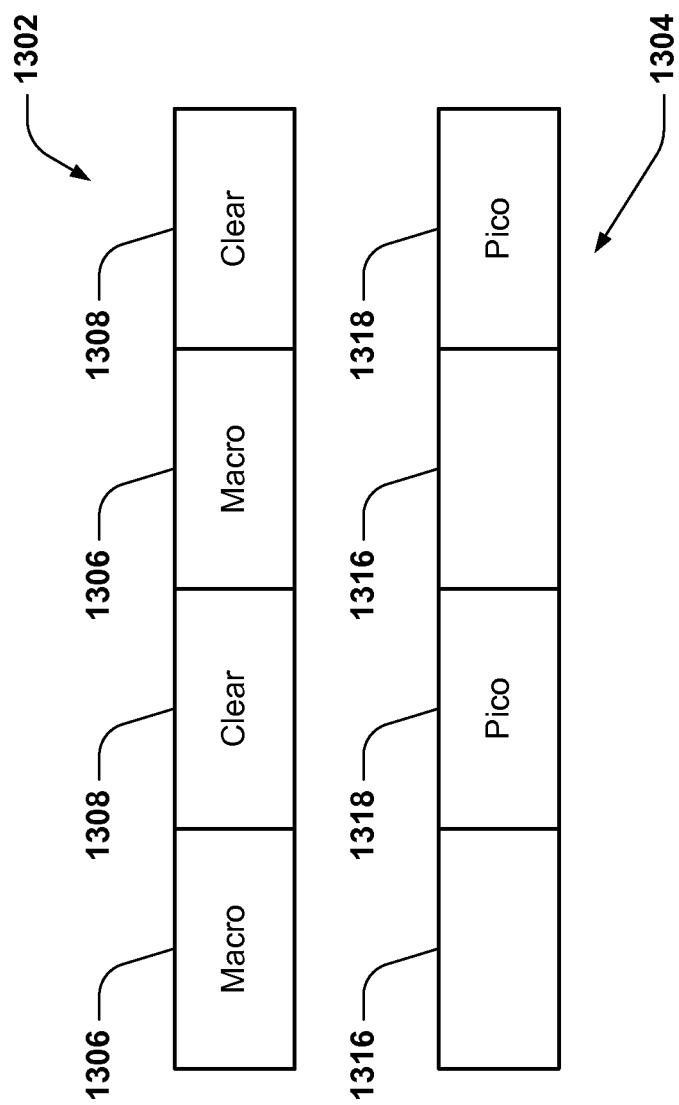
FIG. 13 is a block diagram of transmission subframe multiplexing between a macro cell and a pico cell.

FIG. 13 depicts a subframe partitioning in a HetNet deployment (e.g., as depicted in FIG. 33) where a macro eNB 3310 and a pico eNB 3312 coordinate transmissions by partitioning in the time domain. The subframe sequence 1302 may represent macro subframe ordering in which subframes 1306 may be used by the macro eNB 3310 for transmissions in the macro cell and the subframes 1308 may be left clear by the macro eNB 3310 (i.e., no data transmissions, perhaps some control signals may be transmitted) for use by the pico eNB 3312.

As previously discussed, in some designs, CRS may be used for interference estimation. In designs where CRS patterns used for macro and pico cells are non-colliding, the CRS transmissions in pico cell may collide with data transmissions in the macro cell. It may be appreciated that if a UE 120 measures pico channel quality in pico subframes 1316 (time coincident with macro subframes 1306), the UE 120 may measure high interference, whereas in pico subframes 1318 (time coincident with clear macro subframes 1308), the UE 120 may measure low interference from the macro eNB 3310. In some designs, the UE 120 may therefore report a "good" CQI (measured in subframes 1318) and a "bad" CQI (measured in subframes 1316) to the pico eNB 3312. It will also be appreciated that if macro and pico CRS collide with each other, then in every subframe, UE 120 may measure the "bad" CQI in a pico cell due to interference from CRS in the macro cell.

In designs where CSI-RS is used for interference estimation, when a macro eNB 3310 also mutes data transmissions in the macro cell corresponding to CSI-RS REs for a pico cell 3304, the interference measured by a UE 120 in the pico cell 3304 may always be "good" CQI (because no interfering transmissions from the macro eNB 3310 are present). On the other hand, if macro eNB 3310 does not mute the REs corresponding to the CSI-RS of the pico, then the UE 120 may always report "bad" CQI in the pico cell due to interference from the macro signal.

Based on the above discussion, it may be seen that interference estimation using CSI-RS may always give either "good" CQI estimate or "bad" CQI estimate, whereas interference estimation using CRS may provide "good" CQI estimate in some subframes and "bad" CQI estimate in some other frames, particularly when the UE 120 is informed about which subframes are to be used for interference estimation. Accordingly, in some designs CRS (or another reference signal which exhibits the above-discussed complete overlapping/non-overlapping property) may be used for interference estimation and CSI-RS may be used for channel estimation. As previously discussed, CSI-RS may be transmitted for 8 Tx antenna configurations, while CRS may be limited to one or two antennas, thereby making CSI-RS more suitable for channel estimation.

Therefore, in some designs, two different reference signals may be used by the UE 120 for channel state information generation; a first reference signal for interference estimation and a second reference signal for channel estimation. Furthermore, the first reference signal may be transmitted and used in a first set of subframes (e.g., pico subframes 1318) and the second reference signal may be transmitted and used in a second set of subframes (e.g., other transmission subframes). As is previously discussed, the eNB 110 may choose a CSI-RS configuration (e.g., periodicity of transmission, subframe offset, etc.). In some design, the CSI-RS configuration may be selected based on how frequently the eNB 110 desires to receive a feedback from a particular UE 120. In some designs, the CSI-RS configuration may be selected by the eNB 110, based on how accurately the eNB 110 wants a UE 120 to track time changes in channel and/or interference. The second set of subframes, which carry the second reference signal for channel estimation, may thus be selected by the eNB 110 based at least on the above discussed considerations.

It may be noted that the above discussed HetNet scenario involving a macro eNB and a pico eNB is not limiting, and is only used for ease of explanation. One of skill in the art will appreciate that the above-discussed techniques may be applied to other designs in which transmissions from two eNBs may collide.

Referring to FIGS. 14 to 29, 31 and 32, methods relating to utilizing channel state information reference signals in a wireless communication environment are illustrated. While, for purposes of simplicity of explanation, the methods are shown and described as a series of acts, it is to be understood and appreciated that the methods are not limited by the order of acts, as some acts can, in accordance with one or more embodiments, occur in different orders and/or concurrently with other acts from that shown and described herein. For example, those skilled in the art will understand and appreciate that a method could alternatively be represented as a series of interrelated states or events, such as in a state diagram. Moreover, not all illustrated acts can be required to implement a method in accordance with one or more embodiments.

FIG. 14 is a flow chart of a process 1400 of wireless communication. At box 1402, a wireless device is identified as being a relay device. At box 1404, a channel state information reference signal (CSI-RS) configuration is selected such that at least one CSI-RS can be transmitted to the wireless device in a subset of subframes assigned to relay backhaul transmissions. In some designs, a timing type of the wireless device may be determined and based on the determination CSI-RS transmissions may be limited to a subset of symbols of a subframe in which CSI-RS transmissions are transmitted to the wireless device. For example, the limiting may be such that the subset of symbols may exclude a last symbol or last two symbols in the subframe. In some designs, the selection of the CSI-RS configurations may be performed such that the REs assigned to CSI-RS are non-overlapping with REs assigned to a reference signal for aiding data demodulation. In one aspect, the reference signal may be UE-RS or DM-RS, as previously described. In some designs, the selecting may further include selecting the CSI-RS configuration such that resource elements (REs) assigned to muted REs are non-overlapping with REs assigned to the reference signal for aiding data demodulation.

FIG. 15 is a block diagram of a portion of a wireless communication apparatus 1500. The module 1502 is for identifying a wireless device as being a relay device. The module 1504 is for selecting a channel state information reference signal (CSI-RS) configuration such that at least one CSI-RS can be transmitted to the wireless device in a subset of subframes assigned to relay backhaul transmissions. The apparatus 1500 may further comprise additional modules and/or the modules 1502 and 1504 may be further configured for implementing other subject technology disclosed herein, such as for example, disclosed with respect to the process 1400.

FIG. 16 is a flow chart of a process 1600 of wireless communication. At box 1602, downlink control channel transmissions are performed to a relay node, in a first set of subframes that exclude transmissions of a reference signal. At box 1604, downlink control channel transmissions are performed to the relay node in a second set of subframes by rate matching around REs allocated to the reference signal. The control channel transmissions may, for example, correspond to the R-PDCCH channel, as described previously.

FIG. 17 is a block diagram of a portion of a wireless communication apparatus 1700. The module 1702 is for performing downlink control channel transmissions to a relay node in a first set of subframes that exclude transmissions of a reference signal. The module 1704 is for performing downlink control channel transmissions to the relay node in a second set of subframes by rate matching around resource elements (REs) allocated to the reference signal. The apparatus 1700 may further comprise additional modules and/or the modules 1702 and 1704 may be further configured for implementing other subject technology disclosed herein, such as for example, disclosed with respect to the process 1600.

FIG. 18 is a flow chart of a wireless communication process 1800. At box 1802, a first resource pattern for a first port index is allocated for transmissions of a reference signal to at least one user equipment. At box 1804, a second resource pattern is allocated for a second antenna port index for transmissions of the reference signal to at least one relay node. The second resource pattern is non-overlapping with the first resource pattern when the first antenna port index is different from the second antenna port index. In some designs, the reference signal may, for example, be CSI-RS. In some designs, the reference signal may include REs assigned to CSI-RS transmissions and muted REs.

FIG. 19 is a block diagram of a portion of a wireless communication apparatus 1900. The module 1902 is for allocating a first resource pattern for a first antenna port index for transmissions of a reference signal to at least one user equipment. The module 1904 is for allocating a second resource pattern for a second antenna port index for transmissions of the reference signal to at least one relay node, wherein the second resource pattern is non-overlapping with the first resource pattern when the first antenna port index is different from the second antenna port index. The apparatus 1900 may further comprise additional modules and/or the modules 1902 and 1904 may be further configured for implementing other subject technology disclosed herein, such as for example, disclosed with respect to the process 1800.

Figures 20, 21:
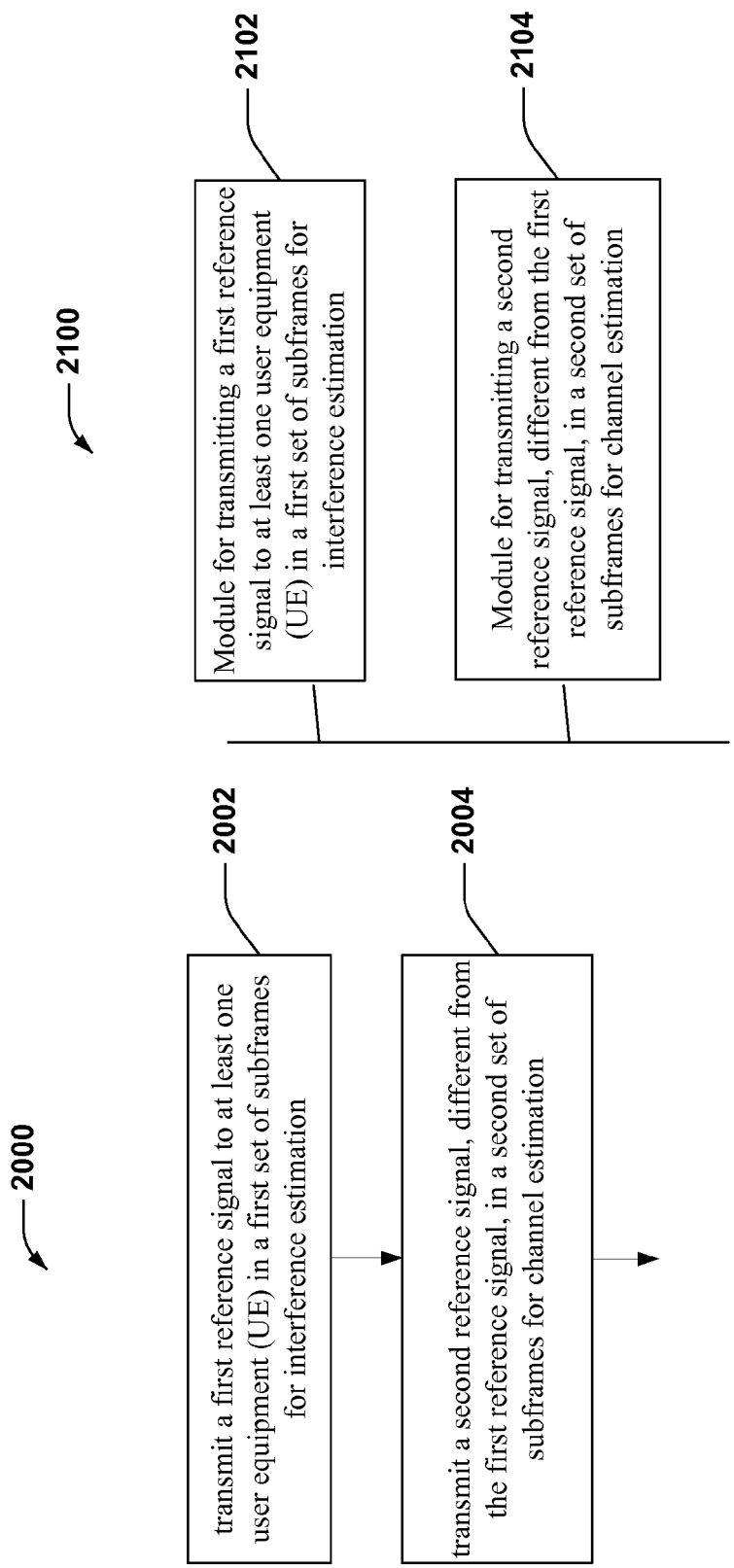
FIG. 20 is a flow chart of a process for wireless communication.
FIG. 21 is a block diagram of a portion of a wireless communication apparatus

FIG. 20 is a flow chart of a process 2000 of wireless communication. At box 2002, a first reference signal is transmitted to at least one user equipment in a first set of subframes for interference estimation. At box 2004, a second reference that is different from the first reference signal is transmitted in a second set of subframes for channel estimation. The reference signals may be "different" in the sense of their PHY characteristics such as power level, spectral shape, scrambling sequences and so on. The reference signal may also be "different" in the sense of their intended use, e.g., channel estimation, interference estimation and so on. In some designs, the first reference signal may be the common reference signal (CRS). In some designs, the second reference signal may be CSI-RS. In some designs, information may be provided to the user equipment identifying subframes from the first set of subframes in which the interference estimation is to be made.

FIG. 21 is a block diagram of a portion of a wireless communication apparatus 2100. The module 2102 is for transmitting a first reference signal to at least one user equipment (UE) in a first set of subframes for interference estimation. The module 2104 is for transmitting a second reference signal, different from the first reference signal, in a second set of subframes for channel estimation. The apparatus 2100 may further comprise additional modules and/or the modules 2102 and 2104 may be further configured for implementing other subject technology disclosed herein, such as for example, disclosed with respect to the process 2000.

FIG. 22 is a flow chart of a process 2200 of wireless communication. At box 2202, a message is transmitted, identifying a wireless device as being a relay device. At box 2204, channel state information reference signals are received in a CSI-RS configuration such that the at least one CSI-RS is received in a subset of subframes assigned to relay backhaul transmissions. In some designs, a message identifying a timing type of the wireless device may be transmitted and CSI-RS transmissions may be received in a subframe in which the CSI-RS transmissions are limited to a subset of symbols. For example, the subset of symbols may exclude the last symbol (or last two symbols) in a subframe. The CSI-RS configuration may be such that REs assigned to CSI-RS may be non-overlapping with REs assigned to a reference signal for aiding data demodulation (e.g., UE-RS). The CSI-RS configuration may further include REs assigned to muted REs that are non-overlapping with the REs assigned to the reference signal for aiding data demodulation.

FIG. 23 is a block diagram of a portion of a wireless communication apparatus 2300. The module 2302 is for transmitting a message identifying a wireless device as being a relay device. The module 2304 is for receiving channel state information reference signals (CSI-RS) in a CSI-RS configuration such that at least one CSI-RS is received in a subset of subframes assigned to relay backhaul transmissions. The apparatus 2300 may further comprise additional modules and/or the modules 2302 and 2304 may be further configured for implementing other subject technology disclosed herein, such as for example, disclosed with respect to the process 2200.

FIG. 24 is a flow chart of a process 2400 of wireless communication. At box 2402, downlink control channel transmissions are received in a first set of subframes that exclude transmissions of a reference signal. At box 2404, downlink control channel transmissions are received in a second set of subframes by rate matching around REs allocated to the reference signal. In some designs, the reference signal may include CSI-RS and muted REs.

FIG. 25 is a block diagram of a portion of a wireless communication apparatus 2500. The module 2502 is provided for receiving downlink control channel transmissions in a first set of subframes that exclude transmissions of a reference signal. The module 2504 is provided for receiving downlink control channel transmissions in a second set of subframes by rate matching around resource elements (REs) allocated to the reference signal. The apparatus 2500 may further comprise additional modules and/or the modules 2502 and 2504 may be further configured for implementing other subject technology disclosed herein, such as for example, disclosed with respect to the process 2400.

FIG. 26 is a flow chart of a process 2600 of wireless communication. At box 2602, a first reference signal is received for interference estimation in a first set of subframes. At box 2604, a second reference signal for channel estimation, different from the first reference signal, is received in a second set of subframes. In some designs, information identifying subframes from the first set of subframes in which the interference estimation is to be made may be received. In some designs, the first reference signal may be a common reference signal (CRS). In some designs, the second reference signal may be channel state information reference signal (CSI-RS).

FIG. 27 is a block diagram of a portion of a wireless communication apparatus 2700. The module 2702 is for receiving a first reference signal in a first set of subframes for interference estimation. The module 2704 is for receiving a second reference signal, different from the first reference signal, in a second set of subframes for channel estimation. The apparatus 2700 may further comprise additional modules and/or the modules 2702 and 2704 may be further configured for implementing other subject technology disclosed herein, such as for example, disclosed with respect to the process 2600.

FIG. 28 is a flow chart of a process 2800 of wireless communication. At box 2802, a message identifying a wireless device being a relay device is transmitted. At box 2804, a CSI-RS resource pattern is selected such that all subframes in which CSI-RS is received lie in access subframes for the relay device.

FIG. 29 is a block diagram of a portion of a wireless communication apparatus 2900. The module 292 is for transmitting a message identifying a wireless device as being a relay device. The module 2904 is for selecting a channel state information reference signal (CSI-RS) resource pattern such that all subframes in which CSI-RS is received lie in access subframes for the relay device. The apparatus 2900 may further comprise additional modules and/or the modules 2902 and 2904 may be further configured for implementing other subject technology disclosed herein, such as for example, disclosed with respect to the process 2800.

Figure 30:
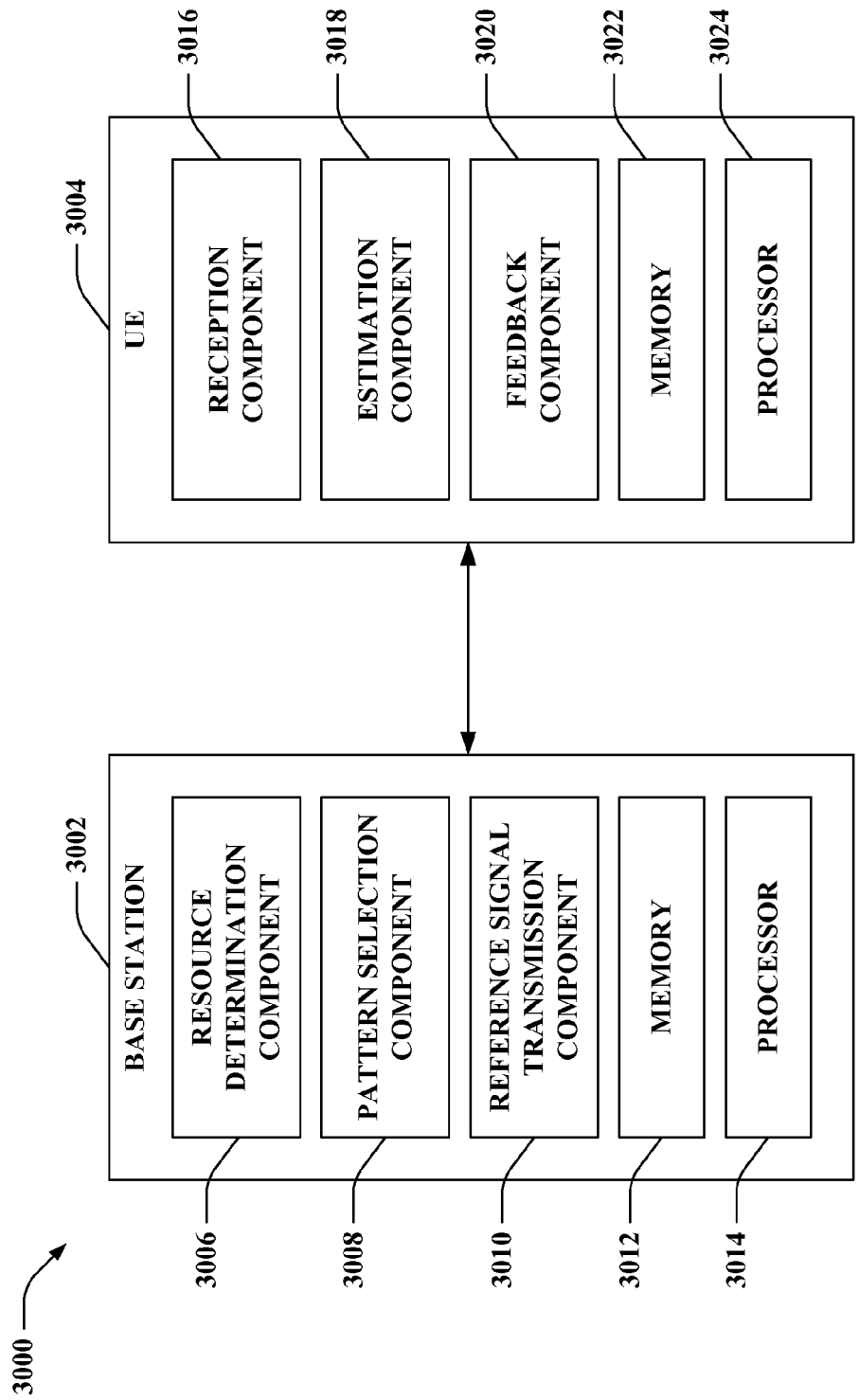
FIG. 30 illustrates a system for utilizing a channel state information reference signal in a wireless communication environment.

FIG. 30 illustrates an example system 3000 that effectuates utilizing a channel state information reference signal (CSI-RS) in a wireless communication environment. System 3000 includes a base station 3002 that can transmit and/or receive information, signals, data, instructions, commands, bits, symbols, and the like. Base station 3002 can communicate with a user equipment (UE) 3004 via the forward link and/or reverse link. UE 3004 can transmit and/or receive information, signals, data, instructions, commands, bits, symbols, and the like. Moreover, although not shown, it is contemplated any number of base stations similar to base station 3002 can be included in system 3000 and/or any number of UEs similar to UE 3004 can be included in system 3000.

Base station 3002 can further include a resource determination component 3006, a pattern selection component 3008, a reference signal transmission component 3010, a memory 3012 and/or a processor 3014. Resource determination component 3006, for example, can identify a number of resource elements (REs) of a resource block available to carry CSI-RS symbols. CSI-RS is a signal that enable UEs, such as UE 3004, to estimate a downlink channel and send feedback information about the downlink channel. In one aspect, CSI-RS can be utilized to support and generate feedback associated with single user multiple-input, multiple-output (SU-MIMO), multiple user MIMO (MU-MIMO), and/or Coordinated Multi-Point (CoMP).

To preserve interoperability with LTE Release 8 UEs (e.g., legacy UEs), resource determination component 3006 can consider one or more restrictions regarding placement of CSI-RS symbols. In one aspect, CSI-RS symbols can be placed to avoid common reference signals (CRS) (also called cell-specific reference signals) symbols as well as resource elements typically employed for CRS symbols. In another aspect, CSI-RS symbols can avoid the first three symbols of a subframe, which can be utilized for control symbols. Further, resource determination component 3006 can consider UE-specific or demodulation reference signals (UE-RS or DM-RS) which are transmitted, in some transmission modes, by base station 3002 to a UE, such as UE 3004, to assist the UE in estimating the channel for data demodulation. After such considerations, resource determination component 3006 identifies a set of available resource elements for which CSI-RS symbols can be placed.

In another aspect, resource determination component 3006 can partition resource elements from the set of available resource elements into orthogonal groups, wherein each group includes sufficient resource elements for a maximum number of antennas supported. For instance, if base station 3002 can support up to eight transmit antennas, the groups of resource elements can include eight resource elements. Further, each resource element in each group can be mapped to a different antenna port. In accordance with an example, FIG. 3 depicts one possible partitioning of resource elements into groups. According to another example, FIG. 4 depicts another possible partitioning of resource elements when base station 3002 supports four transmit antennas. For relay backhaul wireless links, FIGS. 9 and 10 illustrate example CSI-RS designs for eight transmit antennas and 4 transmit antennas, respectively.

Pattern selection component 3008 can select one group to utilize for transmission of CSI-RS symbols. In an example, the group can be selected based upon subframe index, radio frame index, cell ID, etc. Reference signal transmission component 3010 can place CSI-RS symbols in accordance with a pattern (e.g., group) selected by pattern selection component 3008. Subsequently, the subframe can be transmitted to UE 3004 as well as other UEs (not shown).

UE 3004 can include a reception component 3016, an estimation component 3018, a feedback component 3020, a memory 3022, and/or a processor 3024. In an aspect, reception component can receive one or more subframes that include CSI-RS symbols from base station 3002 and any other base stations serving UE 3004 (e.g., in a CoMP configuration). Estimation component 3018 can employ the CSI-RS symbols to generate a channel estimate. Feedback component 3020 can utilize the channel estimate to provide feedback information to base station 3002.

Base station 3002 can further include memory 3012 and processor 3014, and UE 3004 can further include memory 3022 and processor 3024. Memory 3012 and memory 3022 can store data to be transmitted, received data, and any other suitable information related to performing the various actions and functions set forth herein. It will be appreciated that the data store (e.g., memory 3012, memory 3022, . . . ) described herein can be either volatile memory or nonvolatile memory, or can include both volatile and nonvolatile memory. Memory 3012 and memory 3022 of the subject systems and methods is intended to comprise, without being limited to, these and any other suitable types of memory. Moreover, memory 3012 can be operatively coupled to processor 3014, and memory 3022 can be operatively coupled to processor 3024. Processor 3014 can analyze information received by base station 3002 and/or generate information for transmission by base station 3002, and processor 3024 can analyze information received by UE 3004 and/or generate information for transmission by UE 3004. Moreover, processor 3014 can control one or more components of base station 3002, and processor 3024 can control one or more components of UE 3004.

Figure 31:
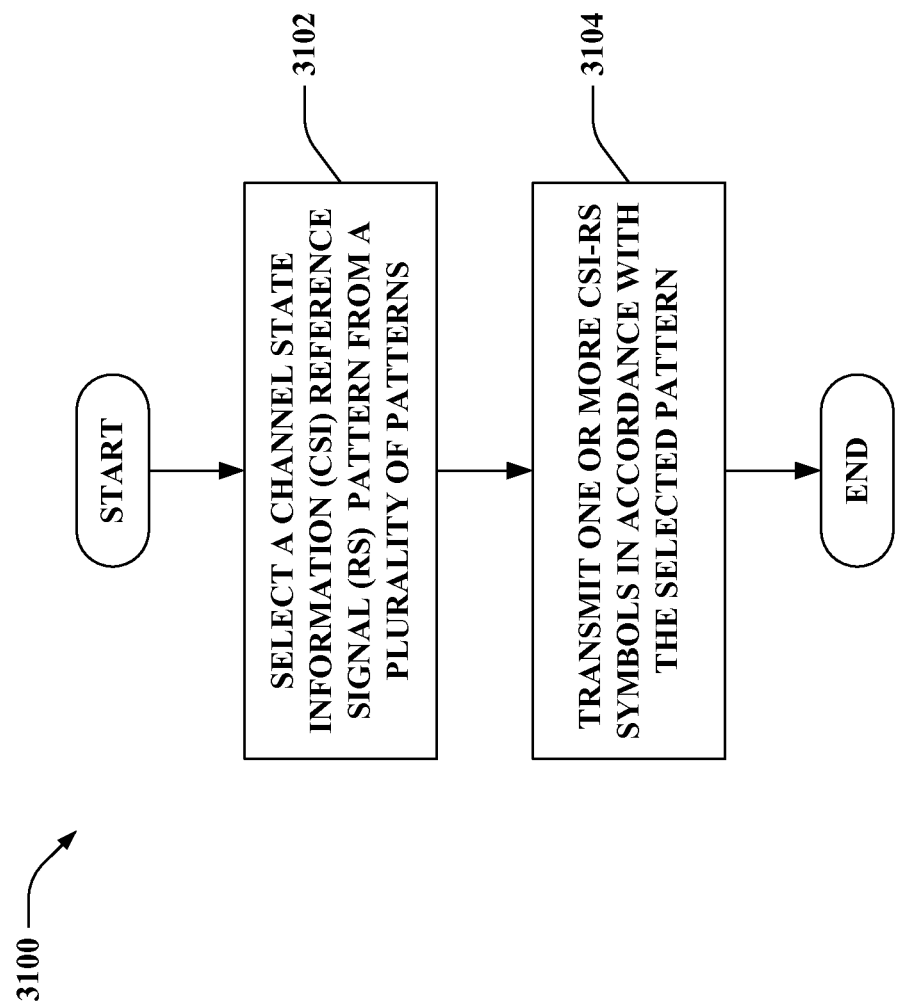
FIG. 31 illustrates a method for transmitting a channel state information reference signal in a wireless communication environment.
Figure 32:
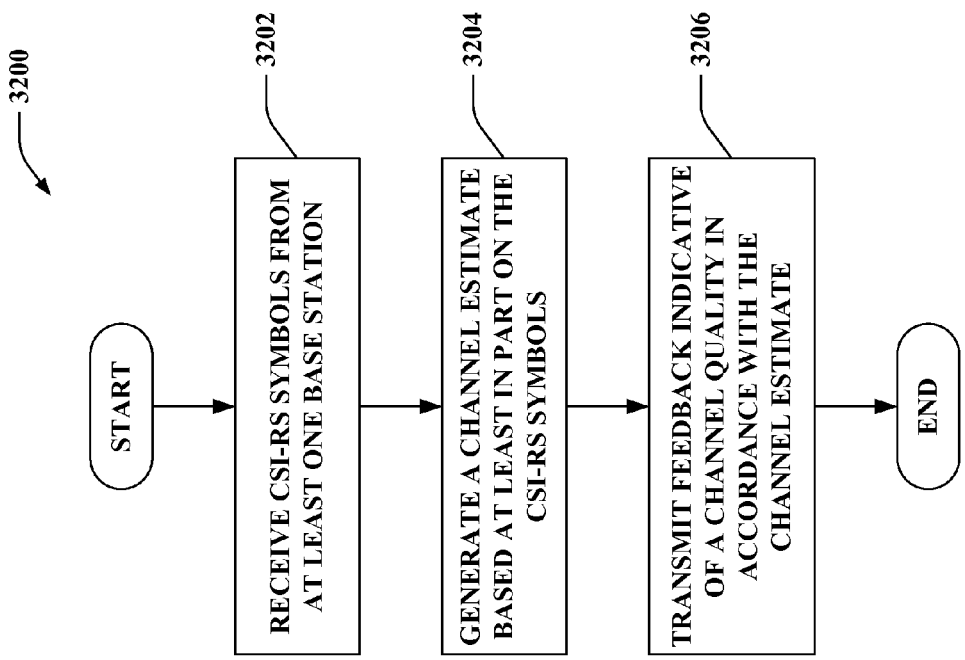
FIG. 32 illustrates a method for receiving a channel state information reference signal in a wireless communication environment.

Referring to FIGS. 31-32, methods relating to utilizing channel state information reference signals in a wireless communication environment are illustrated. While, for purposes of simplicity of explanation, the methods are shown and described as a series of acts, it is to be understood and appreciated that the methods are not limited by the order of acts, as some acts can, in accordance with one or more embodiments, occur in different orders and/or concurrently with other acts from that shown and described herein. For example, those skilled in the art will understand and appreciate that a method could alternatively be represented as a series of interrelated states or events, such as in a state diagram. Moreover, not all illustrated acts can be required to implement a method in accordance with one or more embodiments.

With reference to FIG. 31, illustrated is a method 3100 that facilitates transmitting a channel state information reference signal in a wireless communication environment. At 3102, a channel state information reference signal (CSI-RS) pattern can be selected from a plurality of patterns. The plurality of patterns can be identified based upon a number of resource elements available for CSI-RS symbols and one or more orthogonal groupings which minimize the number impacted space-frequency block coding (SFBC) resource element pairs. At 3104, one or more CSI-RS symbols can be transmitted in accordance with the selected pattern.

Turning to FIG. 32, illustrated is a method 3200 that facilitates receiving a channel state information reference signal in a wireless communication environment. At 3202, CSI-RS symbols can be received from at least one base station. At 3204, a channel estimate can be generated based at least in part on the CSI-RS symbols. At 3206, feedback information is transmitted, wherein the feedback information is determined in accordance with the channel estimate.

It will be appreciated that several different methods and apparatuses for using CSI-RS in wireless networks have been disclosed. In one aspect, CSI-RS RE patterns that support CSI-RS for 2Tx and 4Tx antenna configurations, in addition to 8Tx, and allow reducing the number of CRS ports advertised by a cell to optimize LTE-A performance are disclosed.

Furthermore, in some disclosed designs, CSI-RS avoids CRS symbols, first three OFDM symbols, Rel-10 UE-RS REs, and the PBCH and synchronization signals. Furthermore, in some designs, symbols containing Rel-8 UE-RS may be avoided by configuring E-UTRAN to use a subset of the CSI-RS resources.

It is also disclosed that CSI-RS RE pattern may be cell-specific and may depend on the number of antenna ports, system time and physical cell ID or alternatively, may be indicated with a signaled index from a predefined and enumerated set CSI-RS pattern set, which could also depend on the number of CSI-RS antenna ports and system bandwidth.

In some disclosed designs, all CSI-RS of all cells located in one subframe. Although CSI-RS of different cells may be located in different subframes and advantageously provide better resource reuse. The duty cycle of CSI-RS RE pattern may be semi-statically configured from a limited set of values, e.g. {5, 10, 20} ms.

In some disclosed designs, CSI-RS transmissions avoid subframes allowed for paging. In some disclosed designs, CSI-RS transmissions avoid special subframes in the case of frame structure type 2. In some disclosed designs, CSI-RS of antenna ports of a same cell are orthogonally multiplexed in TDM/FDM fashion. In some disclosed designs, CSI-RS of an antenna port of a cell may be evenly spaced in frequency in one OFDM symbol.

It will further be appreciated that, in some disclosed designs, CSI-RS pattern within subframe of different antenna ports of different cells may hop in time. The hopping may be dependent on the physical cell ID, antenna port index and the system time. If multiple subframes are used, the CSI-RS of a cell may lie in one or few subframes and the subframes containing CSI-RS may hop within the CSI-RS subframe set over time. In some disclosed designs, hopping may be disabled to enable tight CSI-RS reuse coordination in the network.

It will also be appreciated that the use of two different reference signals, one for channel estimation and the other for interference estimation, is disclosed. In certain disclosed designs, a base station may inform a user equipment identities of subframes in which to perform interference estimation.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean serving as an example, instance, or illustration. Any aspect or design described herein as "exemplary" is not necessarily to be construed as preferred or advantageous over other aspects or designs.

The various illustrative logical blocks, modules, and circuits described in connection with the embodiments disclosed herein (e.g., transmitters, receivers, assigners, establishers, data rate matchers, data puncturers, calculators, information receivers, data receivers, and so on), may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methods that may be implemented in accordance with the disclosed subject matter have been described with reference to several flow diagrams. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Additionally, it should be further appreciated that the methods disclosed herein are capable of being stored on an article of manufacture to facilitate transporting and transferring such methods to computers. The term article of manufacture, as used herein, is intended to encompass a computer program accessible from any computer-readable device, carrier, or media.

What is claimed is:

1. A wireless communication method, comprising:
   performing downlink control channel transmissions to a relay node in a first set of subframes that exclude transmissions of a reference signal; and
   performing downlink control channel transmissions to the relay node in a second set of subframes by rate matching around resource elements (REs) allocated to the reference signal.

2. The method of claim 1, wherein the reference signal includes channel state information reference signal (CSI-RS) and muted REs.

3. A wireless communication apparatus, comprising:
   means for performing downlink control channel transmissions to a relay node in a first set of subframes that exclude transmissions of a reference signal; and
   means for performing downlink control channel transmissions to the relay node in a second set of subframes by rate matching around resource elements (REs) allocated to the reference signal.

4. The apparatus of claim 3, wherein the reference signal includes channel state information reference signal (CSI-RS) and muted REs.

5. A computer program product comprising a computer-readable storage medium, the computer-readable storage medium comprising:
   instructions for causing a computer to perform downlink control channel transmissions to a relay node in a first set of subframes that exclude transmissions of a reference signal; and
   instructions for causing the computer to perform downlink control channel transmissions to the relay node in a second set of subframes by rate matching around resource elements (REs) allocated to the reference signal.

6. A processor for wireless communication, configured to:
   perform downlink control channel transmissions to a relay node in a first set of subframes that exclude transmissions of a reference signal; and
   perform downlink control channel transmissions to the relay node in a second set of subframes by rate matching around resource elements (REs) allocated to the reference signal.

7. A wireless communication method, comprising:
   receiving downlink control channel transmissions in a first set of subframes that exclude transmissions of a reference signal; and
   receiving downlink control channel transmissions in a second set of subframes by rate matching around resource elements (REs) allocated to the reference signal.

8. The method of claim 7, wherein the reference signal includes channel state information reference signal (CSI-RS) and muted REs.

9. A wireless communication apparatus, comprising:
   means for receiving downlink control channel transmissions in a first set of subframes that exclude transmissions of a reference signal; and
   means for receiving downlink control channel transmissions in a second set of subframes by rate matching around resource elements (REs) allocated to the reference signal.

10. The apparatus of claim 9, wherein the reference signal includes channel state information reference signal (CSI-RS) and muted REs.

11. A computer program product comprising a computer-readable storage medium, the computer-readable storage medium comprising:
    instructions for causing a computer to receive downlink control channel transmissions in a first set of subframes that exclude transmissions of a reference signal; and
    instructions for causing the computer to receive downlink control channel transmissions in a second set of subframes by rate matching around resource elements (REs) allocated to the reference signal.

12. A processor for wireless communication, configured to:
    receive downlink control channel transmissions in a first set of subframes that exclude transmissions of a reference signal; and
    receive downlink control channel transmissions in a second set of subframes by rate matching around resource elements (REs) allocated to the reference signal.

* * * * *